United States Patent [19]
Eguchi et al.

[11] Patent Number: 5,339,324
[45] Date of Patent: Aug. 16, 1994

[54] LASER BEAM GENERATOR INCLUDING AUTOMATIC RESONATOR LENGTH CONTROL

[75] Inventors: Naoya Eguchi, Tokyo; Michio Oka, Kanagawa, both of Japan

[73] Assignee: Sony Corporation, Tokyo, Japan

[21] Appl. No.: 96,346

[22] Filed: Jul. 22, 1993

[30] Foreign Application Priority Data

Jul. 28, 1992 [JP] Japan ................. 4-201328

[51] Int. Cl.$^5$ ........................ H01S 3/13; H01S 3/08
[52] U.S. Cl. ............................ 372/29; 372/18; 372/21; 372/22; 372/23; 372/32; 372/92; 372/99; 372/107; 372/108
[58] Field of Search ............ 372/21, 22, 29, 32, 372/23, 38, 92, 98, 99, 107, 108, 18, 19

[56] References Cited
U.S. PATENT DOCUMENTS

| | | | |
|---|---|---|---|
| 4,410,992 | 10/1983 | Javan | 372/32 |
| 4,896,324 | 1/1990 | Ball et al. | 372/18 |
| 5,027,360 | 6/1991 | Nabors et al. | 372/18 |
| 5,053,641 | 10/1991 | Cheng et al. | 372/21 X |
| 5,119,385 | 6/1992 | Aoshima et al. | 372/23 |
| 5,130,997 | 7/1992 | Ortiz et al. | 372/21 |
| 5,175,737 | 12/1992 | SooHoo | 372/32 |
| 5,197,073 | 3/1993 | Oka | 372/22 |
| 5,199,038 | 3/1993 | Vahala et al. | 372/18 X |
| 5,206,868 | 4/1993 | Deacon | 372/21 |
| 5,212,711 | 5/1993 | Harvey et al. | 372/18 X |
| 5,278,869 | 1/1994 | Naya et al. | 372/29 |
| 5,293,263 | 3/1994 | DeRijck | 372/29 X |

FOREIGN PATENT DOCUMENTS

0560179A1 9/1993 European Pat. Off. ............. 372/29

OTHER PUBLICATIONS

M. Oka et al., "Second–Harmonic Generator Green Laser for Higher–Density Optical Recording," Japanese Journal of Applied Physics, vol. 31 (Feb. 1992) Pt. 1, No. 2B, pp. 513–528, Tokyo Japan.

F. Zhou et al., "Frequency Stabalization of a Diode–Laser–Pumped Microchip Nd:XYAG Laser at 1.3 μm," Optics Letters, vol. 16, No. 2, Jan. 15, 1991, New York, U.S.

Primary Examiner—Brian Healy
Attorney, Agent, or Firm—Jerry A. Miller; Peter C. Toto

[57] ABSTRACT

A laser beam generator for making wavelength conversion automatically controls the length of an external resonator of a laser source to perform wavelength conversion at a high efficiency by pulling-in a servo using a resonator length error signal and a reflected light signal. A sample-and-hold circuit is used to detect the error signal from the detected light signal which is reflected from the external resonator.

14 Claims, 17 Drawing Sheets

Block diagram of one embodiment of the invention (R1=0.8, Rm=0.85)

Graph of absolute value of reflectance r

Graph of phase of reflectance r

Waveform diagram of detected reflected light

Modulated signal waveform sin (ωmt)

cos (ωmt)

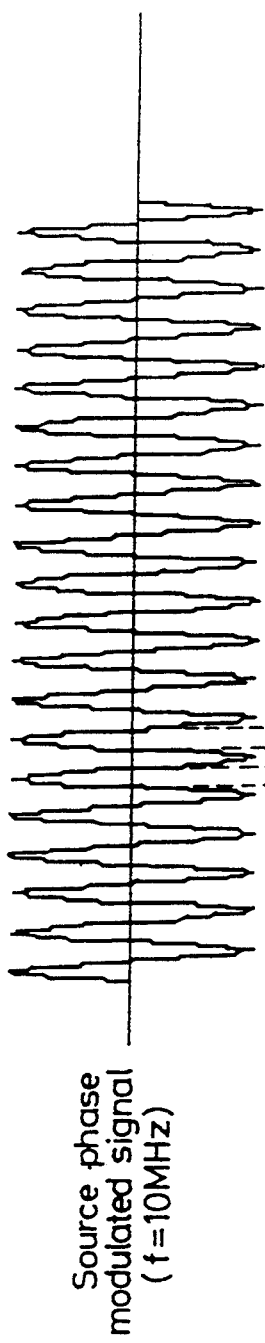
FIG. 11A Source phase modulated signal (f=10MHz)
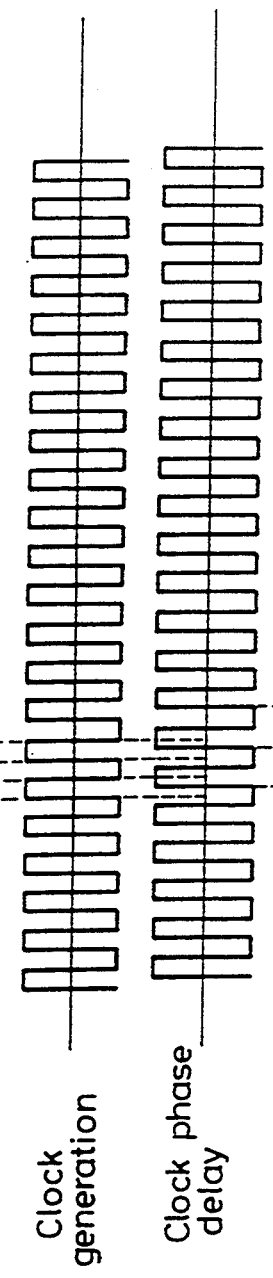
FIG. 11B Clock generation
FIG. 11C Clock phase delay
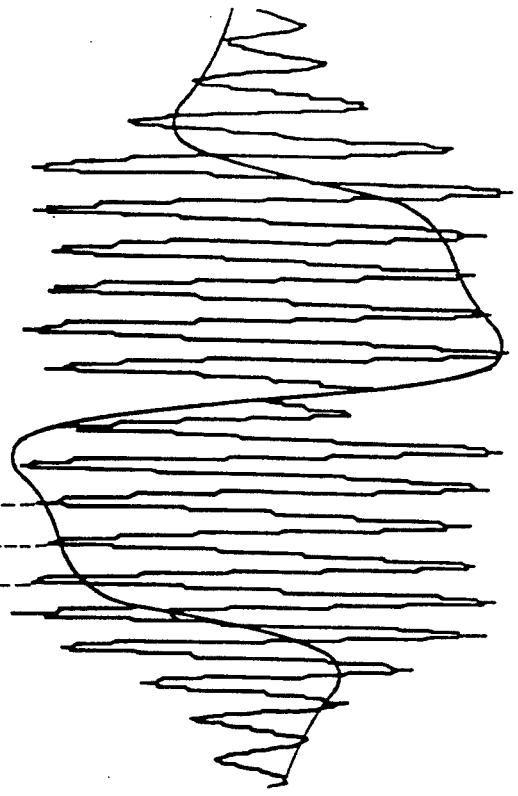
FIG. 11D Sample/hold (synchronous detection)

Block diagram of generator for resonator length error signal and reflected light signal FIG. 13 Servo block diagram

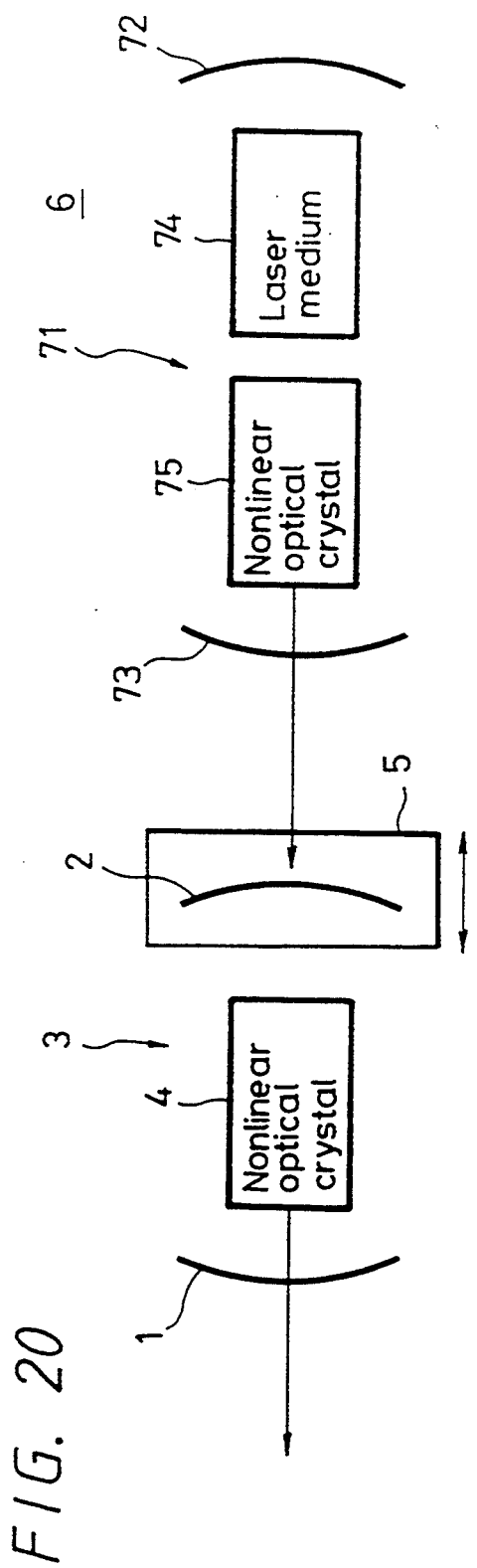
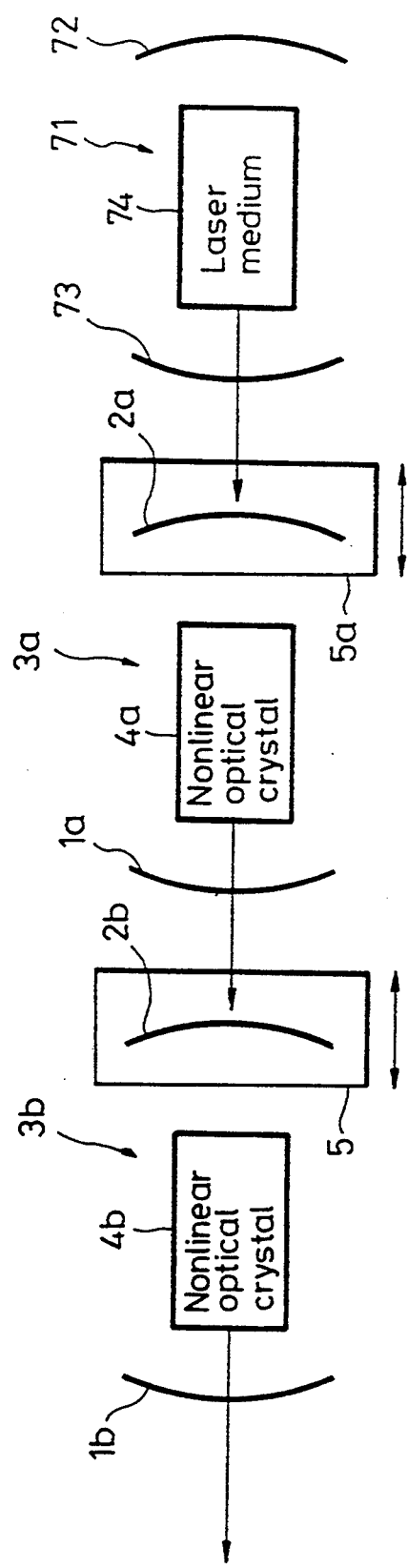
FIG. 20
FIG. 21

LASER BEAM GENERATOR INCLUDING AUTOMATIC RESONATOR LENGTH CONTROL

BACKGROUND OF THE INVENTION

This invention relates to laser beam generators, and particularly to one in which a wavelength-converted laser beam is generated by a nonlinear optical crystal element.

A laser beam generator is proposed in which a nonlinear optical element is disposed within a resonator so that the wavelength conversion by the nonlinear optical element is efficiently made by use of a high-power density within the resonator.

This type of laser beam generator proposed includes, for example, an SHG (second harmonic generator) of external resonator type, or an SHG having a nonlinear optical element provided within a laser resonator.

The SHG of external resonator type has a nonlinear optical element provided between a pair of opposite mirrors constituting the external resonator. A fundamental laser beam is incident to this external resonator, and passed through the nonlinear optical element. The external resonator in this case has a length selected for the resonance to the frequency (wavelength) of the incident laser beam.

In this SHG, of external resonator type, for example, the so-called finesse value (corresponding to Q in resonance) of the resonator is selected to be as high as, for example, about 100 through 1000, so that the light density within the resonator is increased several hundred times the incident light density, thereby making it possible that the nonlinear optical crystal element is effectively operated within the resonator.

In addition, a light source for the incident laser beam to, for example, this external resonator type SHG is formed of a laser medium and, for example, a nonlinear optical element which are disposed between a pair of opposite mirrors constituting a laser resonator. The laser beam emitted as the fundamental wave from the laser medium by, for example, irradiating an exciting light beam on the medium is converted into an SHG laser beam by the nonlinear optical element within the laser resonator. This laser beam is made incident to the external resonator in which the nonlinear optical element is disposed as described above.

In the laser beam generator in which a second harmonic laser beam or higher-order harmonic or sum-frequency laser beam is converted in wavelength by the external resonator, the change (error) of light path length of the external resonator must be controlled to be limited to an extremely small range of 1/1000 through 1/10000 of the resonant wavelength, or under 1Å, that is, an extremely high-precision positional control is necessary.

Thus, for example, the mirrors constituting the external resonator are supported by a laminated piezoelectric element so as to move a very small distance for adjustment in the optical axis direction, and the error signal proportional to the deviation of the resonator length relative to the incident laser beam to the external resonator is fed back to the laminated piezoelectric element, or a servo loop is formed, so that the resonator is automatically controlled in its length, thereby stabilized in its resonance operation to the laser beam which is incident to the external resonator.

SUMMARY OF THE INVENTION

According to this invention, there is provided a laser beam generator for generating a wavelength converted laser beam by a resonant operation to an incident laser beam to a nonlinear optical crystal which is provided within an external resonator having at least a pair of reflecting means, wherein moving means is provided to move in an optical axis direction at least one of the pair of reflecting means, thereby making resonator length control, and the moving means is supplied with a resonator length error signal due to a deviation between the length of the external resonator and that to the incident laser beam and with a reflected signal from the resonator as a result of reflection of the incident laser beam from the resonator as pulling-in signals for resonator length servo in order to lock the external resonator at a length for resonance to the incident laser beam.

According to another aspect of the invention, there is provided a laser beam generator for generating a wavelength converted laser beam by a resonant operation to an incident laser beam to a nonlinear optical crystal which is provided within a resonator having at least a pair of reflecting means, wherein a laser resonator for obtaining the incident laser beam has a laser medium provided between the pair of reflecting means, the laser resonator has moving means provided to make resonator length control by moving at least one of the reflecting means in an optical axis direction, and the moving means is supplied with a resonator length error signal due to a deviation between the length of the external resonator and that to the incident laser beam and with a reflected signal from the external resonator as a result of reflection of the incident laser beam from the resonator as pulling in signals for resonator length servo.

In this invention, a zero-cross level of the resonator length error signal and a certain level or above of the reflected light signal are detected to use as the pulling-in signals for the resonator length servo.

Also, in this invention, the resonator length servo is made active when a zero-cross level of the error signal is detected during a certain time $\tau$ after the resonator length error signal is compared with a certain slice level so that a rising signal is detected.

Moreover, in this invention, the resonator length error signal is generated by sample-and-hold means, or synchronous detection.

In addition, in this invention, the incident laser beam of a frequency fc is modulated in phase by a frequency fm to produce a phase-modulated signal, and a clock signal is generated from the phase-modulated signal and is used to sample and hold the phase-modulated signal.

Furthermore, in this invention, the moving means of the reflecting means is vibrated at a certain frequency so that the incident laser beam to the external resonator is modulated in phase.

Here, the wavelength conversion includes sum frequency mixing, second harmonic generation, fourth harmonic generation and so on.

The object of this invention is to improve the laser beam generator having the automatic controlling servo loop for the resonator length so that the servo operation can be performed more stably and accurately.

BRIEF DESCRIPTION OF THE DRAWINGS

FIG. 11(A-D)—A series of timing charts to which reference is made in explaining the generation of the resonator length error signal.

FIG. 14(a-h)—A series of timing charts to which reference is made in explaining the servo pulling-in.

FIG. 20—A diagram showing a construction of the laser beam generator of the invention.

FIG. 21—A diagram showing a construction of the laser beam generator of the invention.

DESCRIPTION OF THE PREFERRED EMBODIMENTS

Figure 1:
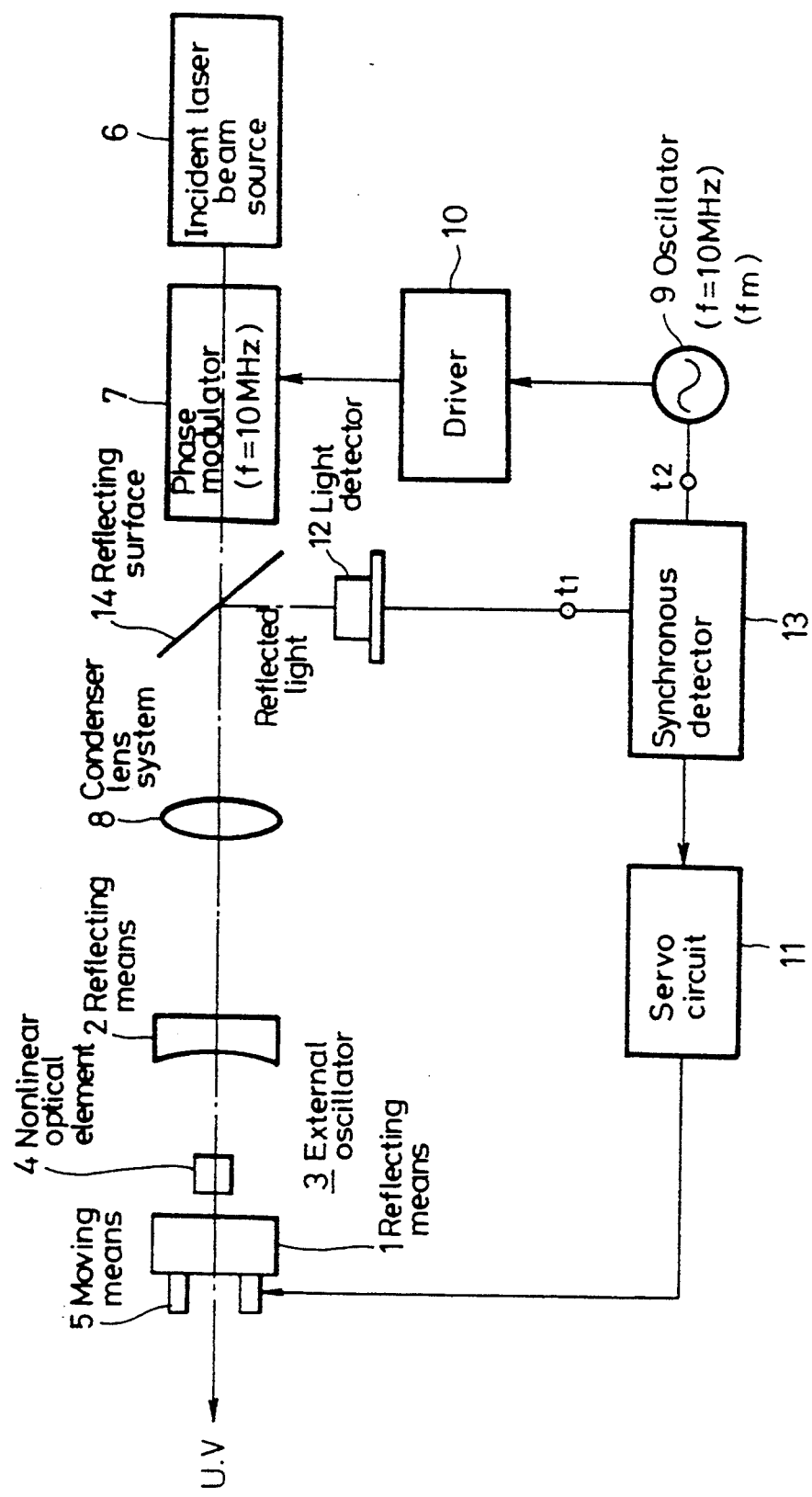
FIG. 1—A schematic block diagram of one embodiment of the laser beam generator of the invention.

FIG. 1 is a basic diagram of one embodiment of a laser beam generator of the invention.

This invention provides a laser beam generator having an external resonator 3 which is formed of, at least, a pair of reflecting means. The laser beam incident to a nonlinear optical element 4 provided within the external resonator is subjected to resonance within this external resonator so that it is converted into a converted-different-wavelength laser beam. In this embodiment of FIG. 1, moving means 5 is provided to move in the optical axis direction the reflecting means 1 which constitutes the external resonator 3 and from which the wavelength-converted laser beam exits.

A laser beam from the source is incident to the other reflecting means 2 side of the external resonator 3.

In FIG. 1, reference numeral 6 represents the light source for this incident laser beam. This light source may be a solid-state laser, semiconductor laser or laser beam generator having an SHG provided within the laser resonator.

The laser beam from the incident laser beam source 6 is passed through a phase modulator 7 and a condenser lens system 8 and enters into the external resonator 3.

The reflecting means 1 of the resonator 3 is formed by, for example, a flat mirror, and the reflecting means 2 is formed by, for example, a concave mirror. The nonlinear optical element 4 is disposed on the light path between the mirrors.

The incident laser beam to the external resonator 3 is reflected from the external resonator 3 as reflected light (return light) and further reflected by a reflecting surface 14 into a light detector by which it is detected. As a result, a synchronous detector 13 detects the output from the light detector to produce a resonator length error signal corresponding to the deviation of the resonator length relative to the incident laser beam to the external resonator 3. This signal is fed to a servo circuit 11, by which the moving means 5 is then controlled to make resonator length servo in accordance with this signal.

The moving means 5 may be an electromagnetic actuator or a piezoelectric element or the like.

The nonlinear optical element 4 may be, for example, potassium titanyl phosphate—KTP (KTiOPO4), lithium niobate—LN (LiNbO3), quasi-phase matched—QPMLN (quasi-phase matching LN), beta-barium-borate—BBO ($\beta$-BaB2O4), lithium triborate—LBO (LIB3O4), or potassium niobate—KN (KNbO3).

An application of this invention to a laser beam generator of SHG type will be described below.

In this case, the nonlinear optical element 4 disposed within the external resonator 3 is made of, for example, BBO.

In this case, the incident laser light source 6 is, for example, an SHG type laser light source. When a green laser beam of, for example, 532-nm wavelength is fed from the source to the external resonator 3, a laser beam of 266-nm wavelength is generated by the SHG of the nonlinear optical element 4 and permitted to exit from the reflecting means 1.

At this time, the reflecting means 2, or the concave mirror of the external resonator 3 reflects most of the input laser beam (532 nm in this case), and the reflecting means 1, or the flat mirror on the exiting side is formed of a dichroic mirror which reflects most of the input laser beam and allows the output laser beam (266 nm wavelength) to pass therethrough.

The phase modulator 7 is, for example, an EO (electro-optic) element or AO (acousto-optic) element.

This phase modulator 7 is supplied with a modulation signal of, for example, fm=10 Mhz from an oscillator 9 through a driver (driving circuit) 10.

The return light, or reflected light, from the external resonator 3, as a result of the incident laser beam to the external resonator 3 is reflected from the reflecting surface 14 into the light detector 12 such as a photodiode, and thereby converted into an electrical signal.

The detected signal is supplied to the sample-and-hold synchronous detector 13, which then produces a resonator length error signal due to the difference between the actual length of the external resonator 3 and a resonator length which is to be resonant to the incident laser beam.

In this case, the resonator length error signal and the reflected light signal are generated and supplied to the moving means 5 as servo pull signals for making the resonator length deviation zero and locking the resonator at the proper length.

The moving means 5 can take, for example, the so-called electromagnetic actuator structure. This electromagnetic actuator can be formed of at least one coil, a magnet and a yoke of a magnetic material like the so-called voice coil motor as will be described later. This electromagnetic actuator consumes a drive current of only several tens through several hundred Ma and can increase the double resonance frequency to 100 Khz or above. Since the frequency characteristic has a small phase shift, the servo region can be widened to be several tens of Khz.

This electromagnetic actuator is able to control the change of the light path length (resonator length) of the resonator, or the positional error of the reflecting means 1 to be below 1/1000 through 1/10000 of the above-mentioned wavelength, or under 1Å.

However, this moving means 5 is not limited to the electromagnetic actuator, but may be a piezoelectric element in some case.

A description will be made of the principle of the introduction of laser beam to an external resonator 15, or the so-called Fabry-Perot resonator, and the error detection. This resonator resonates when the light path phase difference $\Delta$ is an integer multiple of $2\pi$, and greatly changes in reflection phase at around the resonance phase. The frequency control on the resonator by use of this phase change is proposed as Drever Locking in, for example, R.W.P. Drever, et al. "Laser Phase and Frequency Stabilization Using an Optical Resonator", Applied Physics B 31.97–105 (1983). The principle of the error signal detection in this technique will be mentioned below.

In general, when a nonlinear optical element of refractive index n and thickness L is present within the Fabry-Perot resonator, the light path phase difference $\Delta$ is $4\pi nL/\lambda$. In addition, if the transmissivity to the single pulse is represented by T, the SHG conversion efficiency for the single pulse by $\eta$, the incident surface reflectance by R1, and the exit surface reflectance by R2, then the complex reflectance r is expressed by $$\Gamma = \frac{\sqrt{R_1} - \sqrt{R_m}\ e^{i\Delta}}{1 - \sqrt{R_1 R_m}\ e^{i\Delta}} \qquad \text{Equation 1}$$

Figure 2:
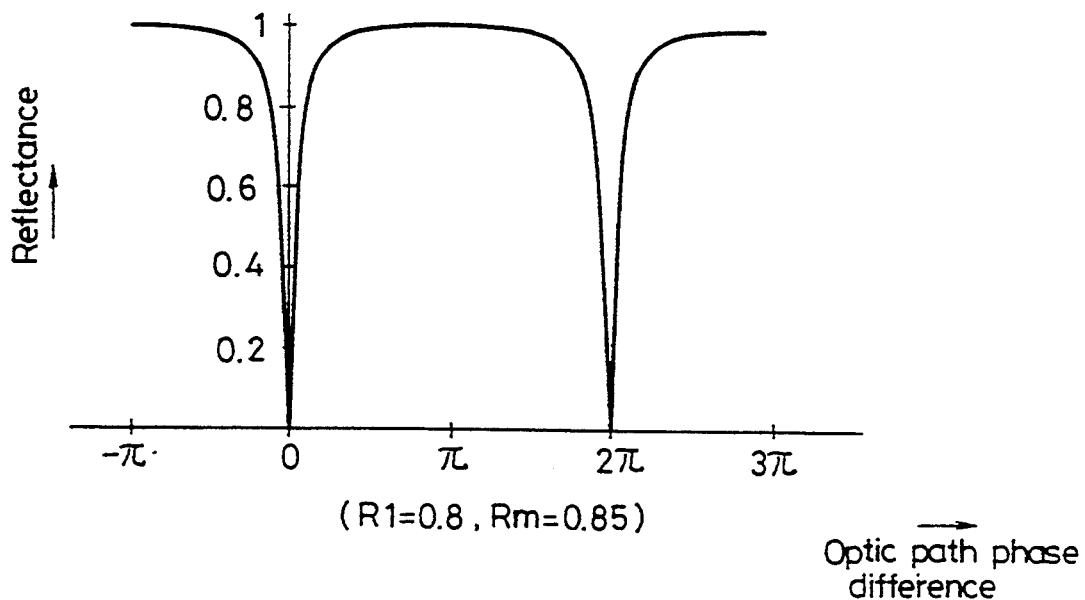
FIG. 2—A graph showing the change of the power reflectance to the optical path phase difference of the resonator.
Figure 3:
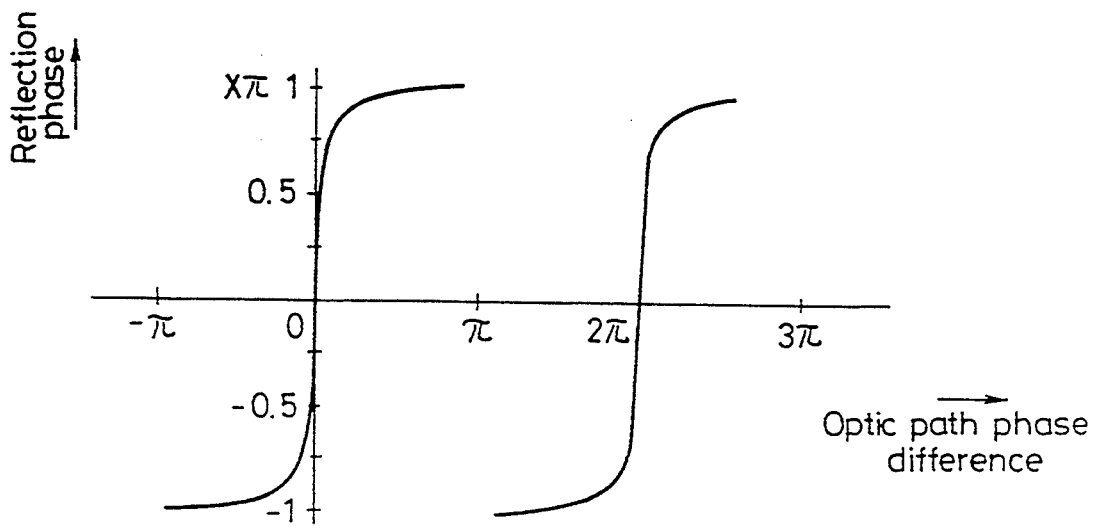
FIG. 3—A graph showing the change of the reflection phase to the optical path phase difference of the resonator.

Where, $Rm = R2\ (T(1-\eta))2$. The absolute value (power-reflectance) and phase (reflection phase) of r at this time are shown in FIGS. 2 and 3, respectively. The resonant frequency fo of the external resonator 3 coincides (in an integral multiple) with the frequency fc of the incident laser (fundamental laser) source 6 by use of this phase change.

The laser beam of a frequency fc (for example, about 500 through 600 THz) from the laser source 6 is fed to the phase modulator 7, where it is modulated in phase by the signal of a frequency fm (for example, 10 Mhz) to generate side bands $fc \pm fm$. The beats of frequency fc, $fc \pm fm$ are detected from the return light from the external resonator 3 of the resonance frequency fo, so that an error signal with a polarity can be obtained.

In other words, when the electric field E from the fundamental wave laser light source 6 is expressed by $E0\ \exp(i\ wc\ t)$, the electric field after modulation is given by $E0\ \exp(i\ (wct + \beta \sin(wmt)))$, where wc is the angular frequency of the fundamental wave laser beam, wm is the angular frequency of the modulation signal to the phase modulator 7, and $\beta$ is the modulation index. When the modulation index is selected to be sufficiently small, for example, $\beta < 0.2$, substantially the wc and two side bands $wc \pm wm$ alone may be considered.

$$E = E0\{J0(\beta)e^{i\omega d} + J1(\beta)e^{i(\omega e + \omega m)t} - J1(\beta)e^{i(\omega e \omega m)t}\} \qquad \text{Equation 2}$$

In this equation (2), $J0(\beta)$, $J1(\beta)$ are 0-th order and first order Bessel functions, respectively.

The electric field of the reflected light from the external resonator 3 has the terms of wc and two side bands $wc \pm wm$ multiplied by complex reflectance, or $$E = E_0[J_0(\beta)\Gamma(\Delta_c)e^{i\omega ct} + \qquad \text{Equation 3}$$
$$J_1(\beta)\Gamma(\Delta_{c+m})e^{i(\omega c + \omega m)t} - J_1(\beta)\Gamma(\Delta_{c-m})e^{i(\omega c - \omega m)t}]$$

$$\Delta_c = \frac{4\pi nL}{\lambda_c} = \frac{2nL\omega_c}{v_c}, \qquad \text{Equation 4}$$

$$\Delta_{c+m} = \frac{2nL(\omega_c + \omega_m)}{v_c},$$

$$\Delta_{c-m} = \frac{2nL(\omega_c - \omega_m)}{v_c}$$

Where $\beta < 0.2$, and $J0(\beta) = \sqrt{(1 - \beta 2/2)} J1(\beta) = \beta/2$, thus $$E = E_0 \left[ \sqrt{1 - \frac{\beta^2}{2}}\ \Gamma(\Delta_c)e^{i\omega ct} + \qquad \text{Equation 5} \right.$$
$$\left. \frac{\beta}{2}\ (\Gamma(\Delta_{c+m})e^{i(\omega c + \omega m)t} - \Gamma(\Delta_{c-m})e^{i(\omega c - \omega m)t}) \right]$$

Therefore, the intensity $|E|^2$ with the second or above terms of $\beta$ neglected is given by $$|E|^2 = EE^{(*)} \qquad \text{Equation 6}$$

$$= E_0^2 \left[ |\Gamma(\Delta_c)|^2 + \frac{\beta}{2}\ [\Gamma(\Delta_c)\Gamma^{(*)}(\Delta_{c+m})e^{-i\omega mt} + \Gamma^{(*)}(\Delta_c)\Gamma(\Delta_{c+m})e^{i\omega mt}] \right.$$

$$\left. \frac{\beta}{2}\ [\Gamma(\Delta_c)\Gamma^{(*)}(\Delta_{c-m})e^{i\omega mt} + \Gamma^{(*)}(\Delta_c)\Gamma(\Delta_{c-m})e^{-i\omega mt}] \right]$$

$$= A(\Delta_c \Delta_{c \pm m})\cos(\omega_m t) + B(\Delta_c \Delta_{c \pm m})\sin(\omega_m t) + E_0^2 |\Gamma(\Delta_c)|^2$$

In other words, it is expressed by the terms of sin(wmt), cos(wmt).

$$A(\Delta c, \Delta c \pm m) = \beta E_0^2 Re\{I(\Delta c)I^{(*)}(\Delta c + m) - I(\Delta c)I^{(*)}(\Delta c - m)\} \quad \text{Equation 7}$$

$$B(\Delta c, \Delta c \pm m) = \beta E_0^2 Im\{I(\Delta c)I^{(*)}(\Delta c + m) + I(\Delta c)I^{(*)}(\Delta c - m)\} \quad \text{Equation 8}$$

When this reflected light is synchronously detected by giving a proper phase to the original modulation signal (angular frequency wm), the equations (7) and (8) are obtained which are the terms of sin(wmt) and cos(wrnt), respectively. The error signal can be derived from the equation (8) which is the coefficient of sin(wmt).

Figure 4:
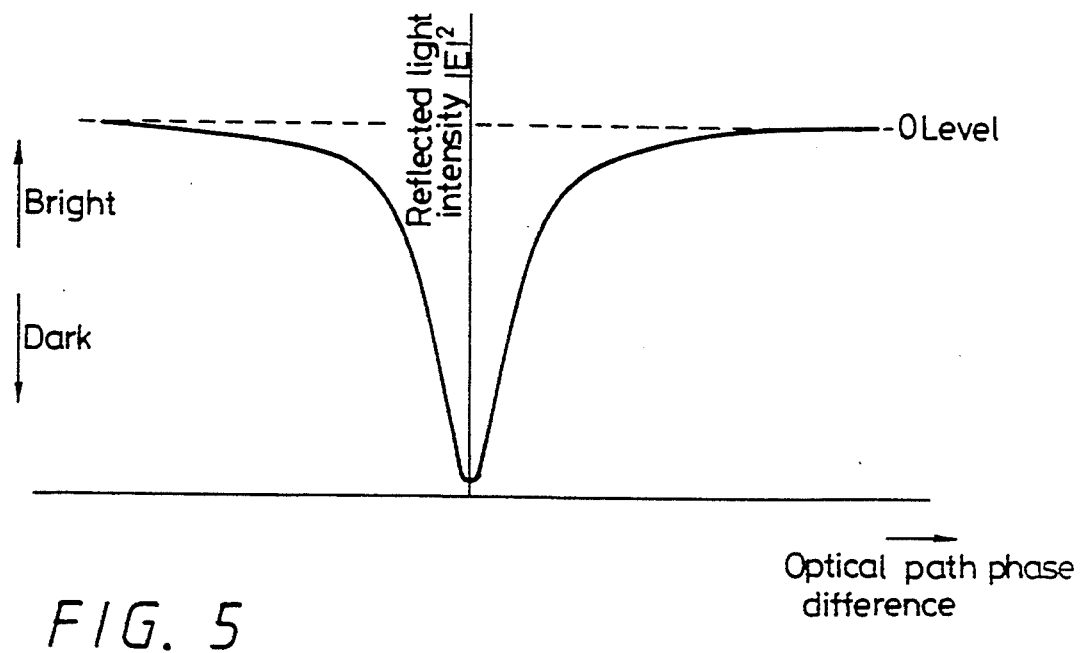
FIG. 4—A graph showing the reflected light intensity to the optical path phase difference of the resonator.
Figure 5:
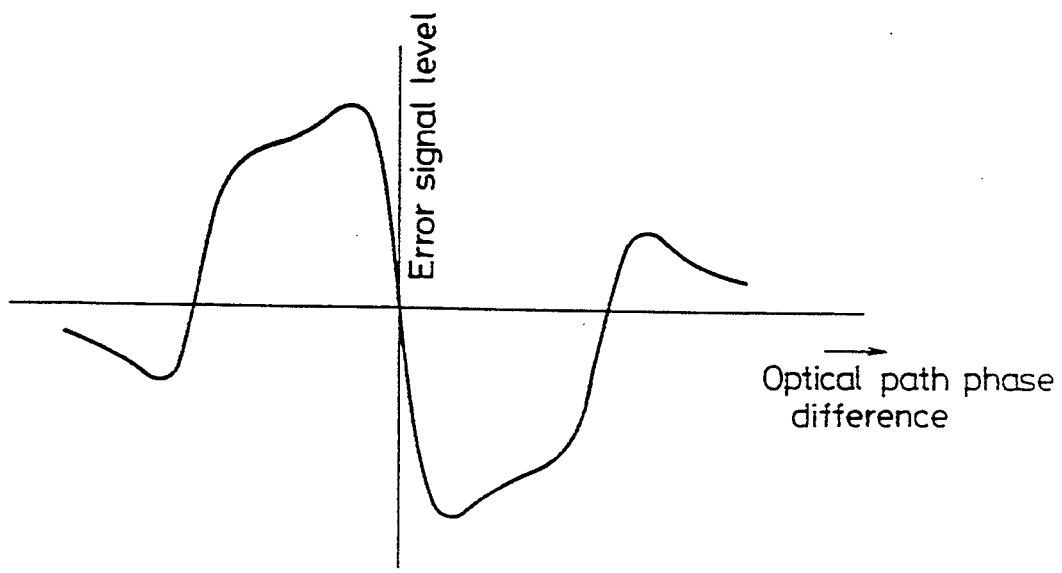
FIG. 5—A graph showing the error signal level to the optical path phase difference of the resonator.

FIGS. 4 and 5 show the intensity $|E|^2$ of the reflected light and the error signal, respectively.

When the external resonator 3 is resonant with the incident laser beam, the reflected light intensity becomes the minimum value since its energy is sufficiently absorbed by the resonator 3, or since the return light is small.

This error signal, or the resonator length error signal is produced by sampling and holding, or synchronously detecting, the detected reflected light signal from the light detector 1.

In this case, the resonator length error signal is detected by the sample-and-hold means, and the reflected light signal is produced.

Figure 6:
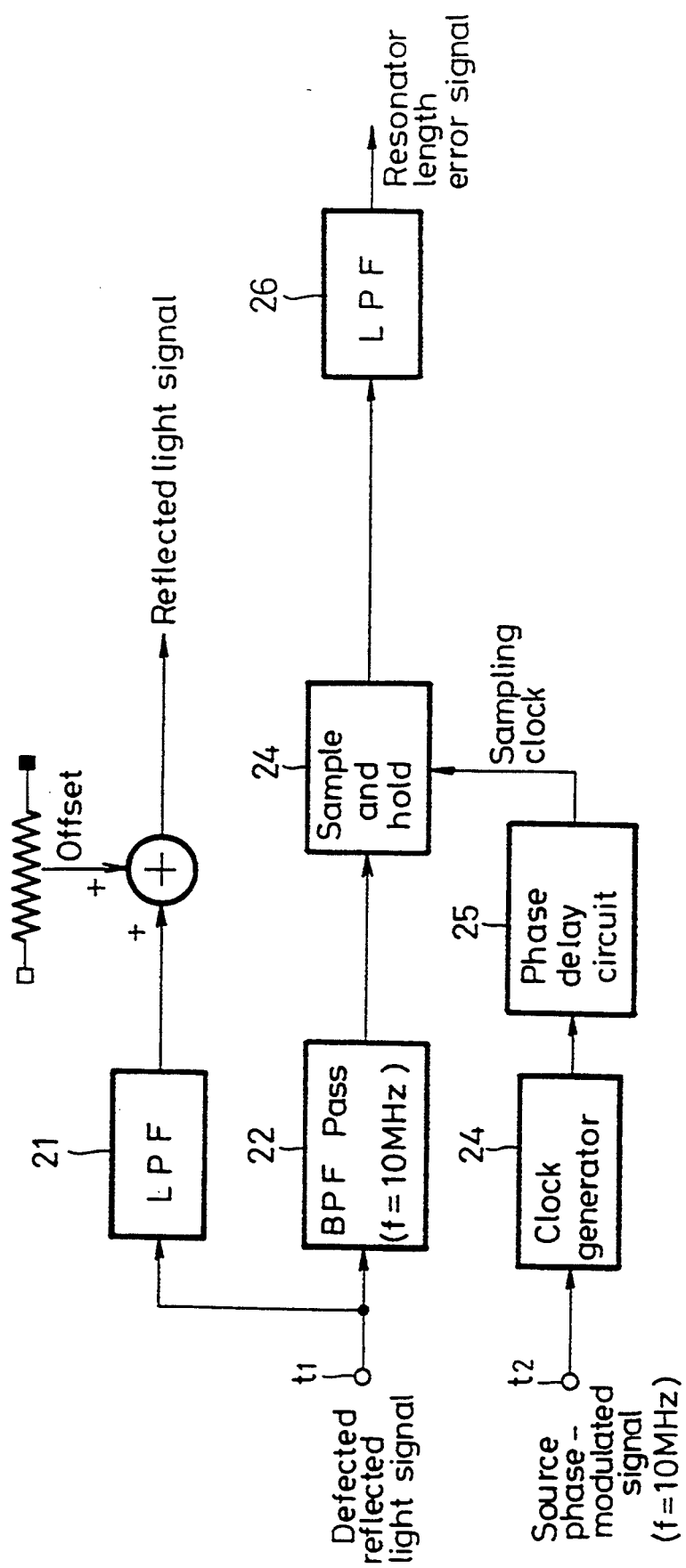
FIG. 6—A block diagram of a generation circuit for the resonator length error signal and the reflected light signal.

The generation circuit for the resonator length error signal and the reflected light signal will be described with reference to FIG. 6.

Figure 7:
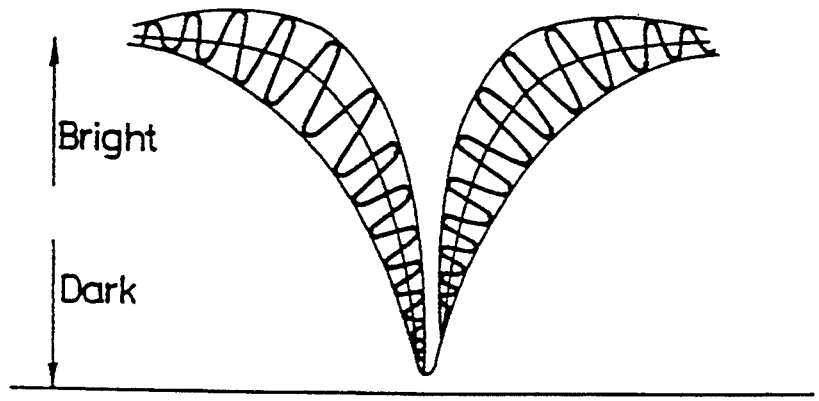
FIG. 7—A waveform diagram of the detected signal of the reflected light from the resonator.

FIG. 7 shows the detected signal from the light detector 1 in FIG. 1. This signal is the sum of the reflected light (return signal) from the external resonator 3 as a result of incidence of the laser beam to the external resonator from the light source 6, and the modulated signal (for example, 10 Mhz) from the phase modulator 7.

This detected reflected signal is fed to an input terminal t1. Part of the signal at the input terminal is supplied to a low-pass filter 21, where the modulated signal is removed, and then fed to an adder where it is added with an offset signal, so that the large, or bright reflected light level of the reflected light signal as indicated by a broken line is set to zero as shown in FIG. 4.

Figure 8:
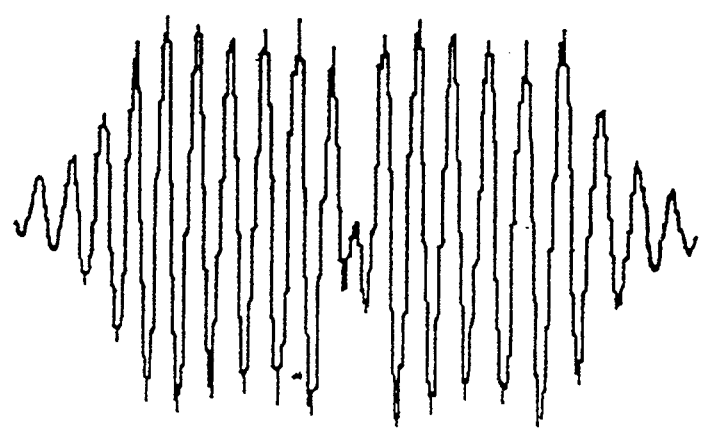
FIG. 8 A waveform diagram of the modulated signal component of the reflected-light detected signal.

The remaining part of the input signal at the input terminal t1 is passed through a band-pass filter 22, so that the modulated signal shown in FIG. 8 is produced from the filter. This modulated signal is then separated into the terms of sin(wmt) and cos(wmt) shown in FIGS. 9 and 10, and the envelopes thereof are derived as the error signal. In this case, since the envelope of the sin(wmt) component is actually excellent in shape, this sin(wmt) component is produced.

In order to obtain the sin (rant) component, the modulated signal from the band-pass filter 22 is supplied to a sample-and-hold circuit 23.

The oscillation signal of f = 10 Mhz(corresponding to fm), or light source phase modulation signal, as shown in FIG. 11A, from the oscillator 9 of FIG. 1 is fed to an input terminal t2. This signal is converted into a binary clock signal, as shown in FIG. 11B, by a clock generation circuit 24. The clock signal is further supplied to a phase delay circuit 25, thereby delayed a certain amount of phase as shown in FIG. 11C which is used as a sampling clock to the sample-and-hold circuit 23. The sample-and-hold circuit samples at the clock and holds the modulated signal shown in FIG. 8 to produce the detected output shown in FIG. 11D. This detected signal is passed through a low-pass filter 26 so that the error signal shown in FIG. 5 can be obtained which corresponds to the envelope of the sin(wmt) component of FIG. 9 derived from the detected reflected light signal of FIG. 7.

Figure 9:
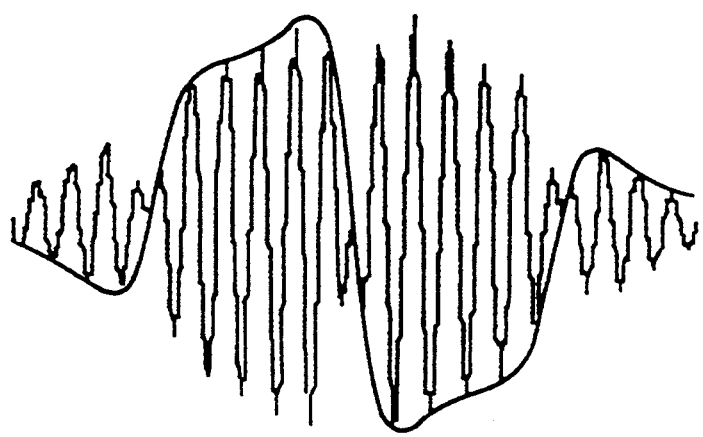
FIG. 9—A waveform diagram of the sin(rant) of the modulated signal component of the reflected light detected signal.
Figure 10:
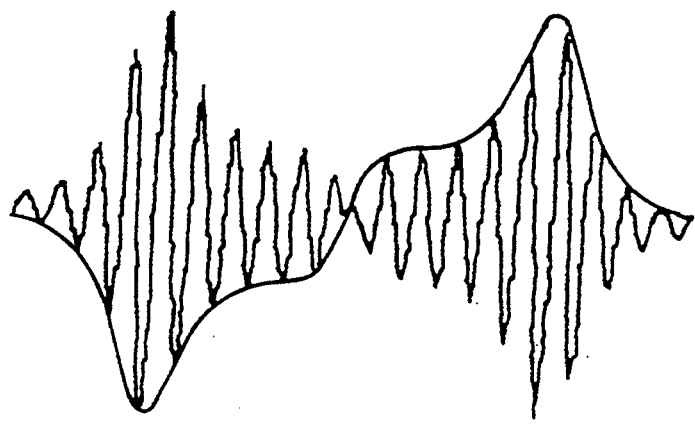
FIG. 10—A waveform diagram of the cos(wrnt) of the modulated signal component of the reflected light detected signal.

In this case, the amount of delay that the phase delay circuit 25 delays is selected so that the envelope of the sin(wmt) component shown in FIG. 9 has the highest S/N ratio.

When the synchronous detection is made by the sample-and-hold means, it is possible to solve the problem that the error signal cannot be precisely separated into the sin component and cos component by use of a multiplier in the general detection method, or that the S/N ratio is poor.

Figure 12:
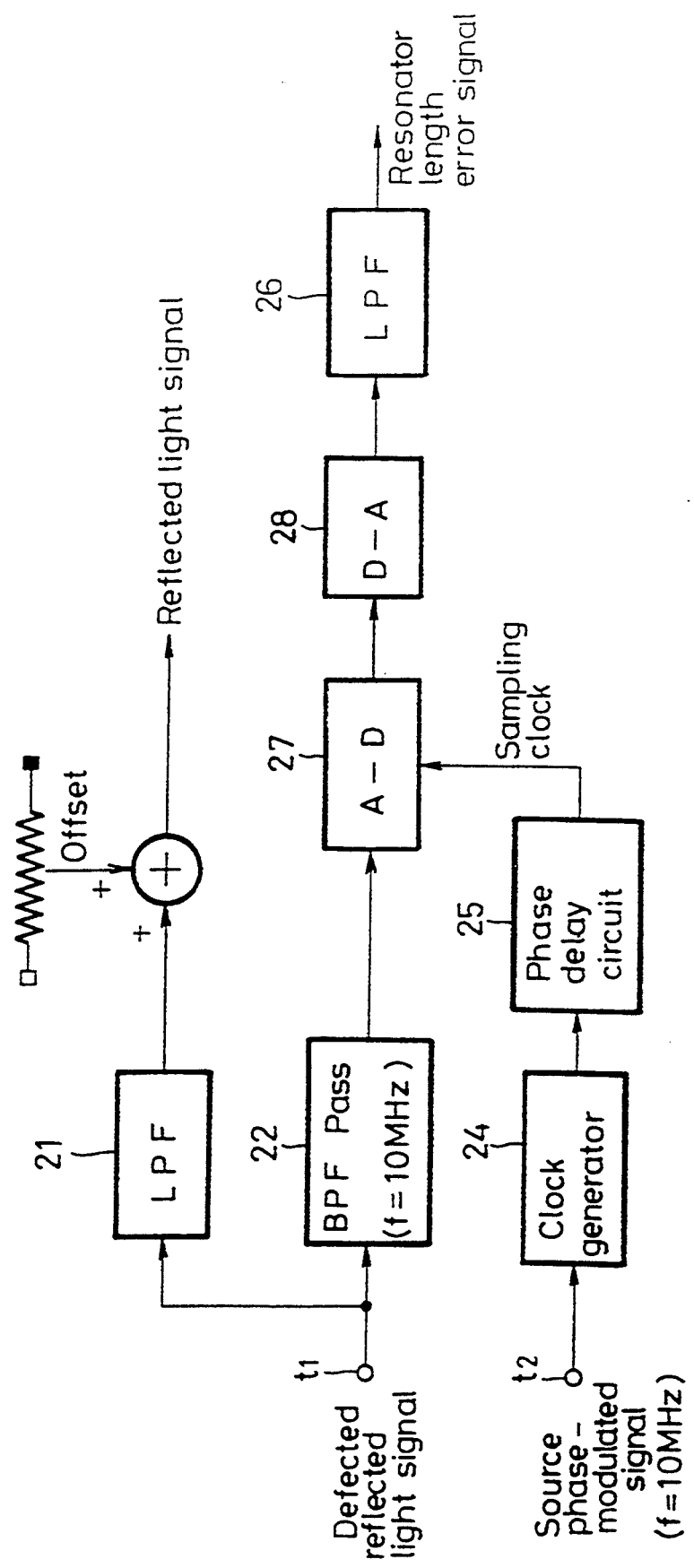
FIG. 12—A block diagram of the generation circuit for the resonator length error signal and the reflected light signal.

FIG. 12 shows another example of the sample-and-hold detection means. In FIG. 12, like elements corresponding to those in FIG. 6 are identified by the same reference numerals and will not be described. In this example, an A/D converter 27 and a D/A converter 28 are used to make the sample-and-hold operation.

Figure 13:
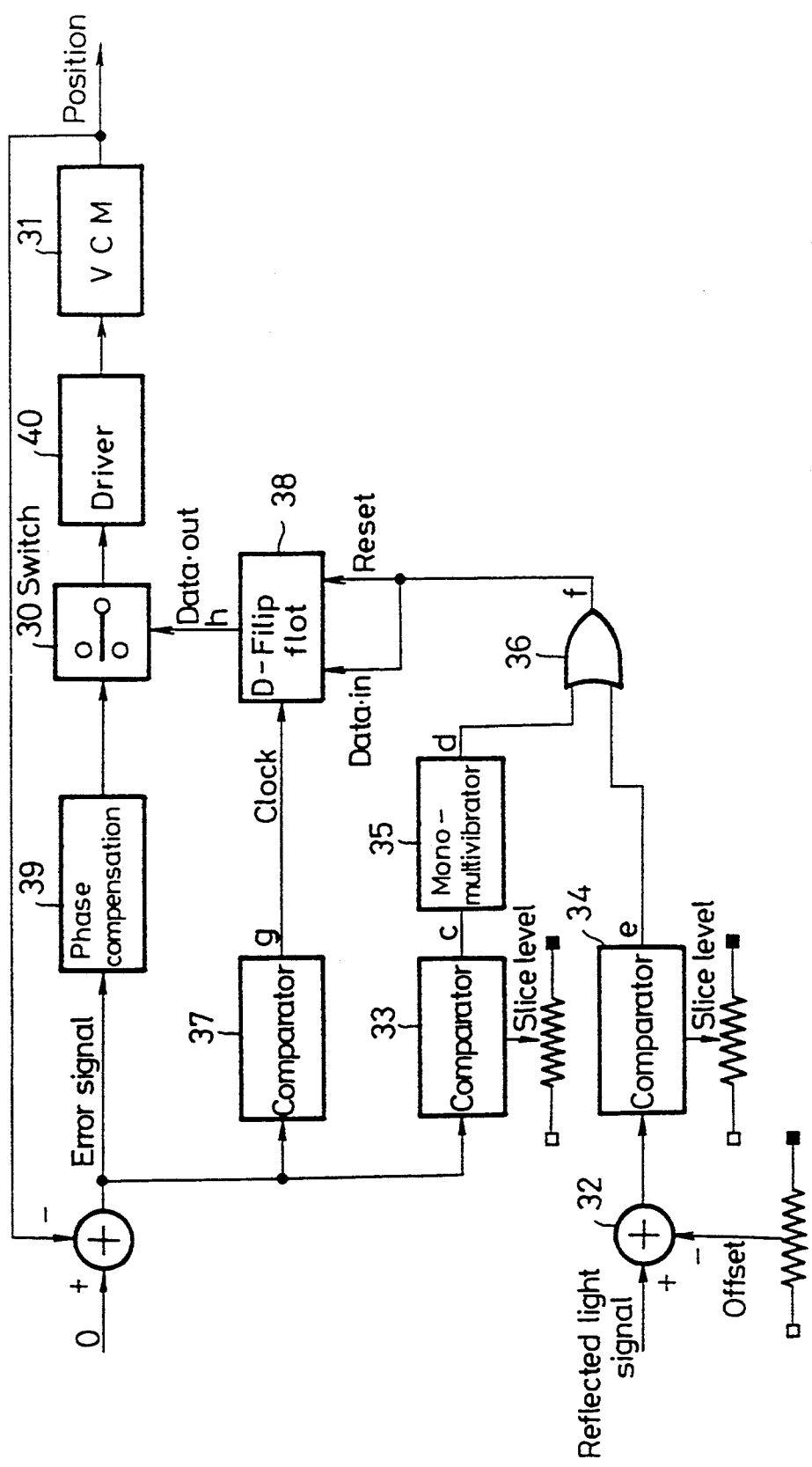
FIG. 13—A servo block diagram.

The servo using the electromagnetic actuator as the moving means 5 will be mentioned with reference to the block diagram of FIG. 13. Shown at 30 is a switch for making the on-off operation of the servo control on the so-called voice coil of the drive motor of an electromagnetic actuator 31.

The servo loop is controlled to open and close by use of the resonator length error signal and the reflected light signal produced as described above.

Figure 14:
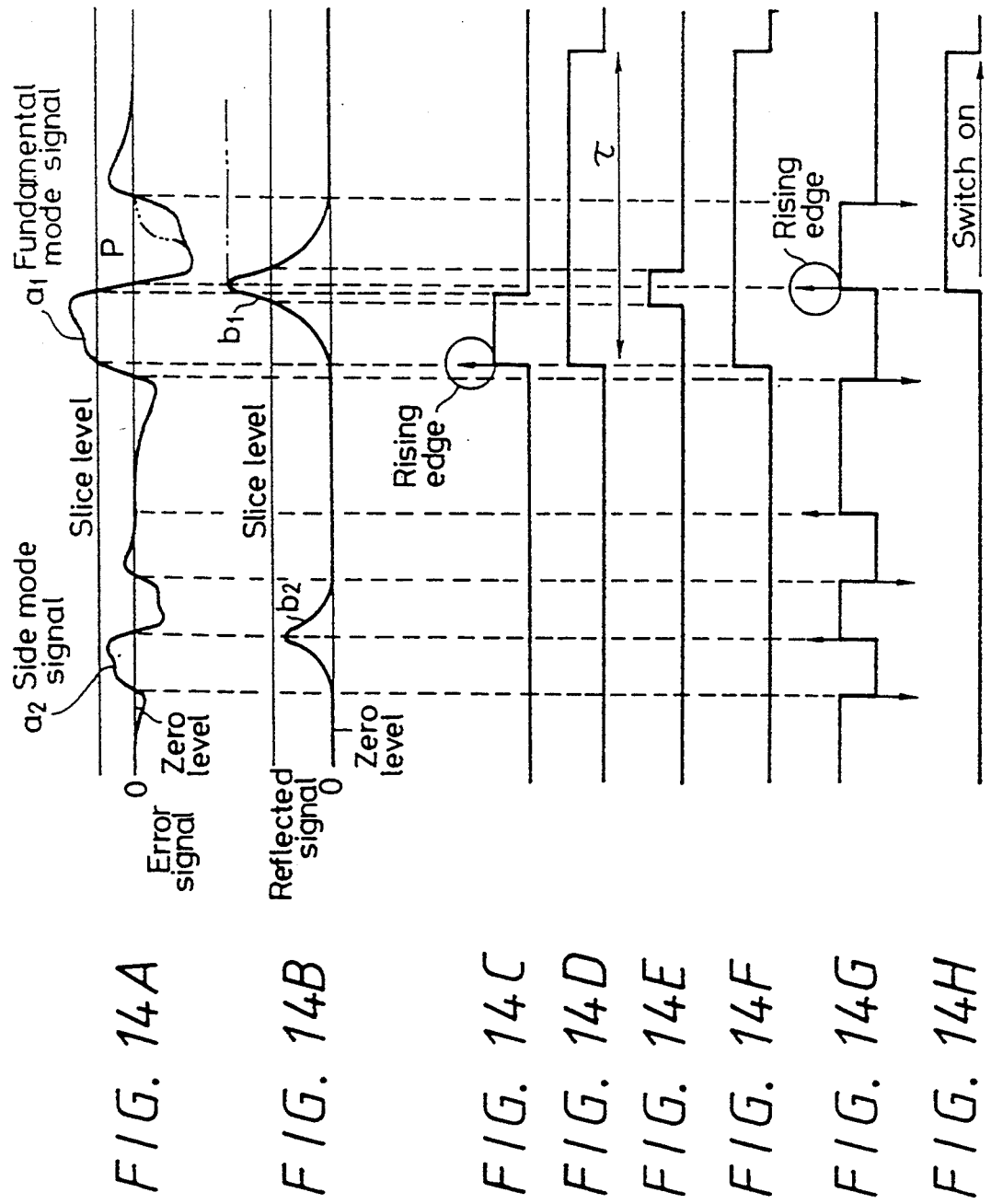

FIG. 14 is a timing chart showing the timing of the control to open and close the servo loop. The signals c through h correspond to the signals c through h of the servo block diagram of FIG. 13.

The servo loop is pulled in when the reflected light signal has a predetermined level or above and when the resonator length error signal (hereinafter, referred to simply as the error signal) crosses a zero point.

FIGS. 14a and b show the error signal and the reflected light signal, respectively. In this case, side modes a2, b2 are shown in addition to the fundamental modes a1, b2. In other words, the incident laser source fundamentally generates a single mode, but sometimes generates side modes such as lateral mode and longitudinal mode in addition to the fundamental mode under various conditions. As will be described later, the pull-in operation of the servo is avoided in the side modes.

The reflected light signal is added with an offset signal by an offset adder 32 as shown in FIG. 13 so that the base line is zero level. In this case, the positive side of the reflected light signal shown in FIG. 14b indicates that the reflected light (return light) from the external resonator 3 which is resonant is small, or dark as shown in FIG. 4.

The error signal and the reflected light signal are respectively fed to comparators 33 and 34 where they are compared with certain slice levels which are higher than the levels of the side mode signals a2 and b2 and lower than the levels of the fundamental mode signals a1 and b2. As a result, the comparators remove the side modes and noise, and produce signals c and e, as shown in FIG. 14, corresponding to only the levels of fundamental mode signals a1 and b1 which are higher than the slice levels.

The signal c from the comparator 33 is fed to a monostable multivibrator 35, which produces a gate signal d for opening the gate for a proper time τ from the leading edge of the signal c.

An OR circuit 36 is provided which produces a signal f which is on, as shown in FIG. 14, when either one of the signals d and e is in the on-state.

In addition, a comparator 37 is provided which compares the error signal with zero level, and produces a signal g which, as shown in FIG. 14, falls off and rises at the cross points of the fundamental mode and side modes of the error signal with zero level.

A D-type flip-flop 38 is provided which produces a signal h, as shown in FIG. 14 when the leading edge of the clock g is supplied to the flip-flop and when the "1" level of the output f from the OR circuit 36 is fed to the reset terminal of the flip-flop. This signal makes the switch 30 on. In other words, the servo is pulled in.

The flip-flop 38 is maintained to be on until the reset signal from the OR circuit 36 turns 0.

The error signal is fed to a phase compensation circuit 39, thereby compensated for its phase. The signal from the phase compensation circuit is passed through the switch 30 which is on and fed to a driver 40. The output from the driver drives the drive portion 31 of the electromagnetic actuator so that the reflection means 5 of the external resonator 3 shown in FIG. 1 is controlled to move in the optical axis direction, changing the resonator length of the external resonator 3.

When the resonator length is selected to be a value at which the resonator is resonant with the incident laser beam, the amount of the reflected light from the resonator 3 is small, and hence the level of the detected signal from the light detector 12 is reduced. As a result, the error signal is zero, and the electromagnetic actuator stops at this position, thus locked at the resonant state.

According to this construction, a predetermined slice level is set for the error signal, and also the OR circuit 36 produces the reset signal of this slice level or above to the flip-flop. Signals corresponding to the side modes and noise are removed. Then, the first zero-cross level, or the zero level of the fundamental mode signal as the original error signal comes after the side modes and noise are removed. Only this zero level, as indicated at point P in FIG. 14a, is used to turn the switch 30 on, or the servo is pulled in by this zero level.

Once the servo becomes active, the error signal is converged to zero level by the resonator length control as indicated by the chain line in FIG. 14a. Thus, when the pull-in of the servo is made by only this error signal, it cannot be decided whether the error signal is zero or not or whether the servo is active or not. However, according to the above construction, when the servo is active, the reflected light signal is maintained to be above the slice level as indicated by the chain line in FIG. 14b, and thus the reset output 1 from the OR circuit 36 is kept to be fed to the flip-flop 38, or the switch 30 is maintained to be on.

In other words, in this construction, the OR operation using both the error signal and the reflected light signal can avoid unnecessary pull-in of the servo or excessive servo, or the so-called overshoot, due to the side modes and noise. In addition, the servo is sure to be pulled in, be avoided from running out of control, and stabilize in operation. Even if the servo is once out of a correct pull-in range, it is quickly stabilized and can make correct control on the resonator length.

The side modes and noise of the reflected light signal can also be removed by the slice level setting, and thus erroneous operations can be avoided.

A description will be made of one example of the electromagnetic actuator structure of the moving means 5 for the reflecting means by which the resonator length is controlled.

Figure 15:
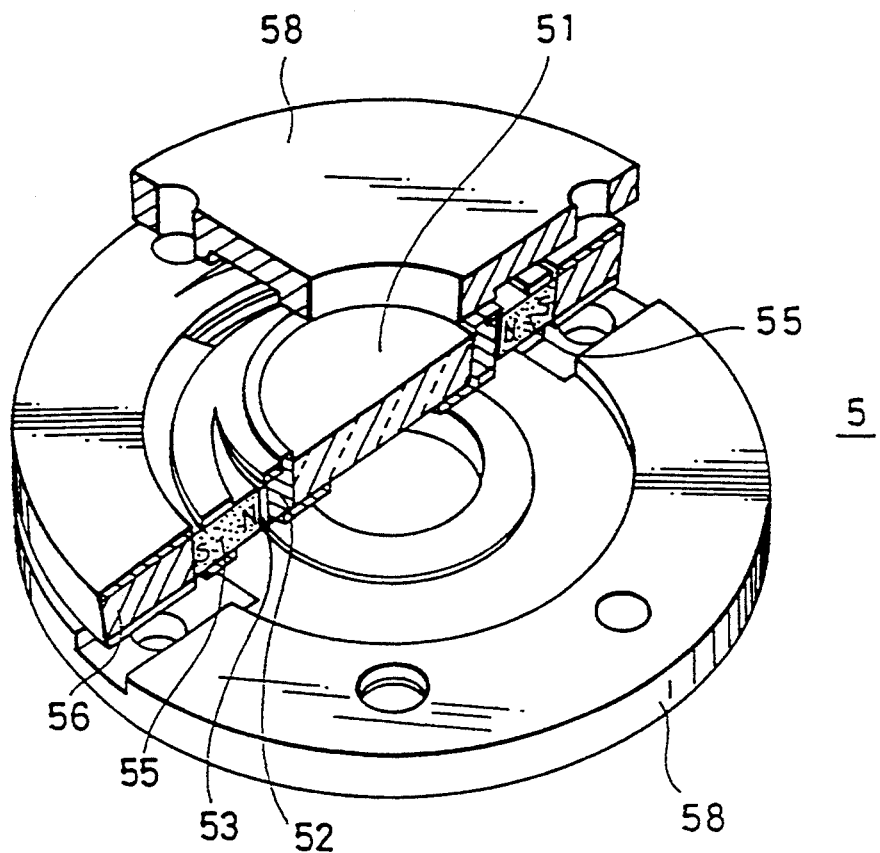
FIG. 15—A partially cut-away perspective view of a specific example of the electromagnetic actuator.

FIG. 15 is a partially cut-away perspective view of one example of the electromagnetic actuator.

In FIG. 15, the reflecting means 1 shown in FIG. 1 is formed by a reflecting mirror 51 with a coating. This mirror is fixedly fitted in a coil bobbin 52 which is made of a ring-shaped, or cylindrical, insulator of ceramic or other materials. A coil (the so-called voice coil) 53 is wound, like a solenoid, on the coil bobbin 52.

Figure 16:
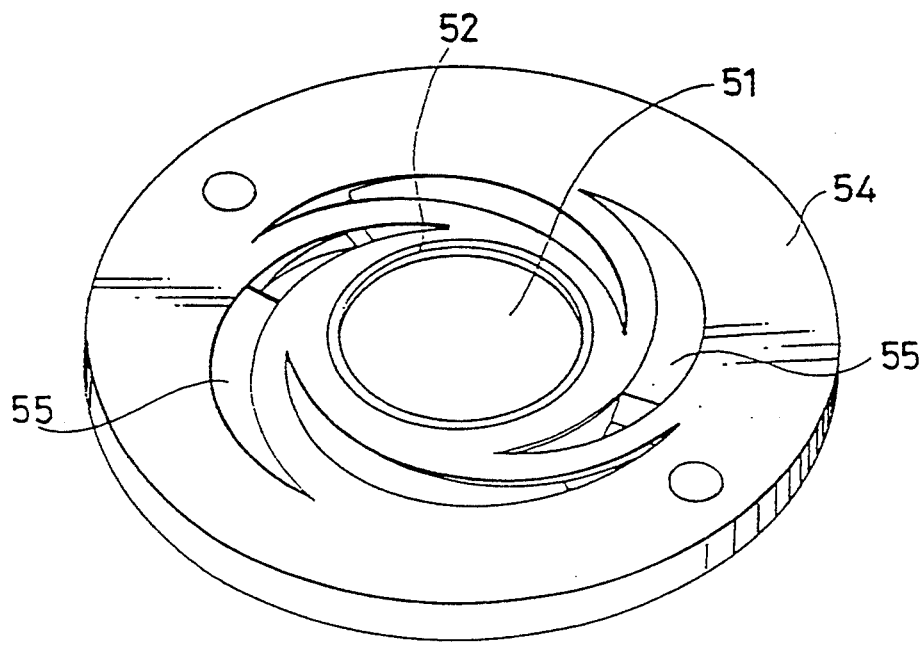
FIG. 16—A schematic perspective view of the spiral leaf spring used in the specific example of the electromagnetic actuator.

This coil bobbin 52 is mounted on a leaf spring 54 of a whirling shape (spiral shape) as shown in FIG. 16. The spiral shaped leaf spring 54 is fixedly supported through a permanent magnet 55 on a ring-shaped yoke 56.

The magnet 55 is disposed to surround the coil 53 which is cylindrically wound on the coil bobbin 52. This magnet 55 is magnetized to have, for example, the N-pole on the inner peripheral side and the S-pole on the outer peripheral side.

The outer periphery of the magnet 55 is fixed to the yoke 56 of a ferromagnetic material such as iron with an adhesive or the like.

The leaf spring 53 is fixed to, for example, the upper and lower sides of the coil bobbin 52 with an adhesive or the like. The outer periphery of the leaf spring 53 is supported on the yoke 56. All the parts are held between two shielding plates 57, 58 of a ferromagnetic material such as iron.

The shielding plates 57, 58 serve both as themselves and as a return path for the magnetic flux from the magnet 55 together with the yoke 56. Since all the parts are surrounded by these shielding plates 57, 58, this actuator can be satisfactorily handled with ease.

According to the electromagnetic actuator of this structure shown in FIG. 15 (and FIG. 16), no conductive and magnetic substance like metal is used within the coil 53, and the magnetic circuit is substantially closed. Thus, the driving force (driving force in the optical axis direction) is large and the transmission characteristic has a small phase shift. In addition, since the coil bobbin 52 is made of a ceramic material, the moving portion is lightweight, and thus the double resonant frequencies can be extended to 100 Khz or above.

The coil 53 of the electromagnetic actuator corresponding to, for example, the drive control portion 31 shown in FIG. 13 is supplied with a servo current from the driver 40 so that the mirror 51, or the reflecting means 1 is moved in the optical axis direction.

While in the embodiment shown in FIG. 1 the moving means 5 is provided so that the reflecting means 1 of the external resonator 3 on the beam-exiting side can be moved in the optical axis direction, the moving means 5, for example, the electromagnetic actuator can be provided to move the incident-side reflecting means 2 or both means 1 and 2 in the optical axis direction.

Figure 17:
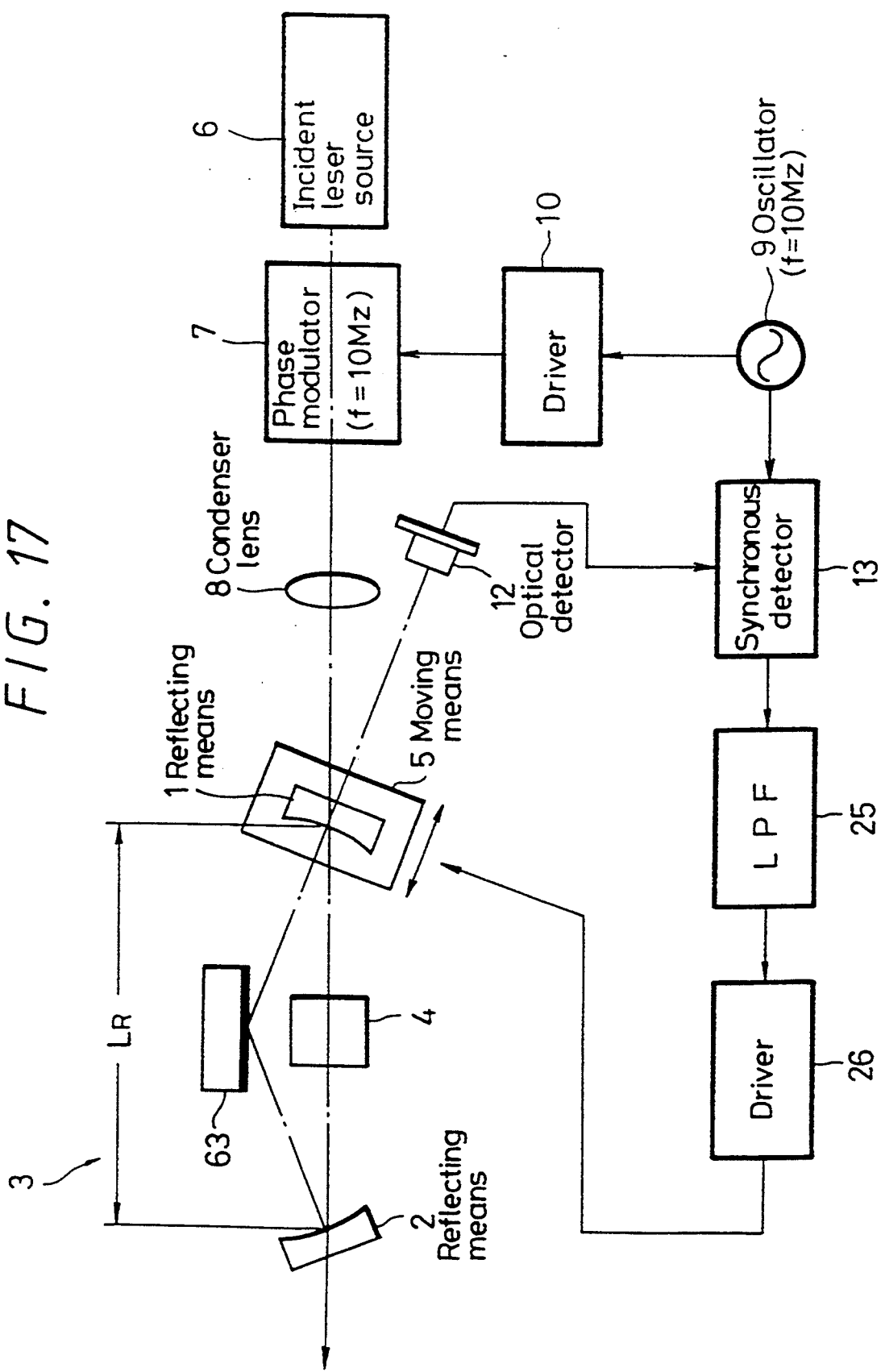
FIG. 17—A construction diagram of another embodiment of the laser beam generator of the invention.

FIG. 17 shows another embodiment of the laser beam generator of the invention. The incident laser beam, or fundamental wave laser beam emitted from the laser light source 6 is modulated in phase by the phase modulator 7, and is incident to the external resonator 3 through the condenser lens 8. This external resonator 3 has the first and second reflecting means of concave mirrors 1, 2, and the nonlinear optical crystal element 4 disposed between the reflecting means. The light path of the resonator 3 is formed of these reflecting means 1, 2 and a flat mirror (its reflecting surface) 63.

When the light path length LR of the resonator 3 is changed so that the light path phase difference $\Delta$ is an integral multiple of $2\pi$, the resonator resonates and greatly changes the reflectance and reflection phase. For example, the reflecting means 1 of the resonator 3 is moved in the optical axis direction by the moving means 5, for example, the electromagnetic actuator.

In FIG. 17, like elements corresponding to those in FIG. 1 are identified by the same reference numerals and will not be described.

The laser beam generator of the invention can take other various constructions than those of the above embodiments. Some basic constructions of the laser beam generator of the invention will be described with reference to FIGS. 18 to 22.

Figure 18:
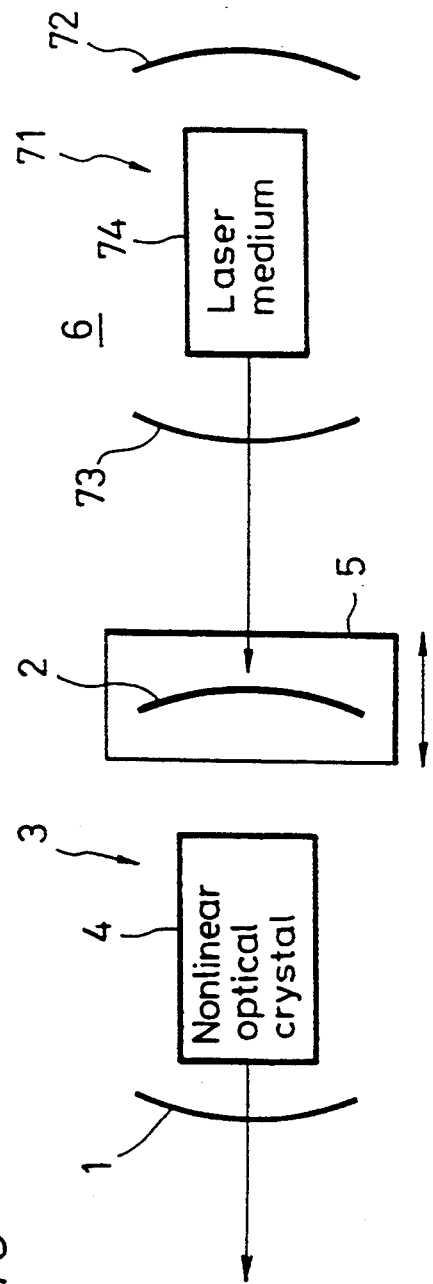
FIG. 18—A diagram showing a construction of the laser beam generator of the invention.

In FIG. 18, the laser source 6 is a so-called solid-state laser oscillator which has a laser medium 74 of Nd:YAG or the like disposed between a pair of reflecting surfaces (reflecting means) of a resonator 71. The fundamental wave laser beam of, for example, 1064 nm in wavelength from the laser source 6 is incident to the nonlinear optical crystal element 4 of LN or the like between the pair of reflecting surfaces (reflecting means) 1, 2 of the external resonator 3. Then, for example, the second harmonic of 532 nm in wavelength is generated (SHG), and one of the reflecting surfaces of the external resonator 3, for example, the reflecting surface 2 is moved in the optical axis direction by the electromagnetic actuator as the moving means 5.

Figure 19:
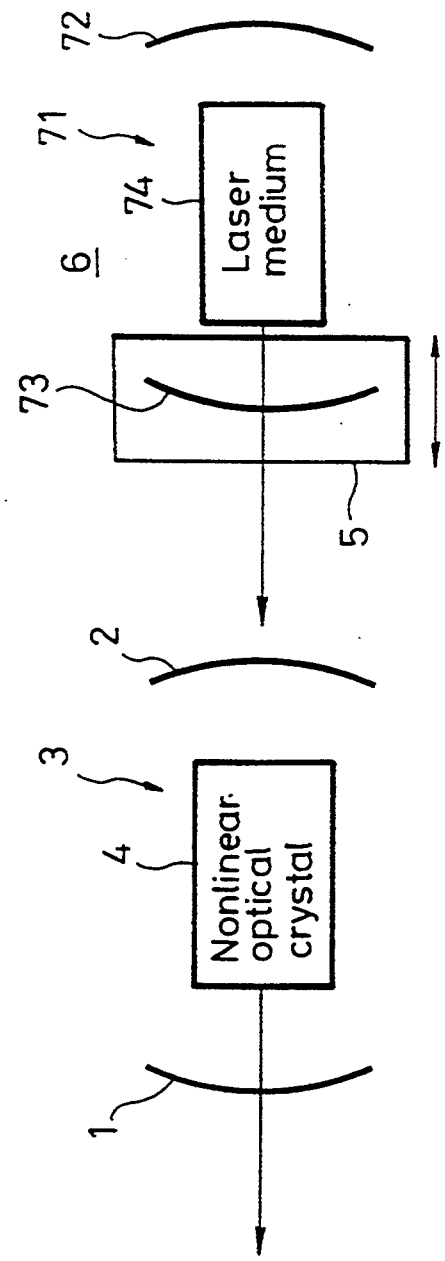
FIG. 19—A diagram showing a construction of the laser beam generator of the invention.

In FIG. 19, the laser source 6 is a solid-state laser oscillator which has the laser medium 74 of Neodymium doped yttrium aluminum garnet (Nd:YAG) or the like disposed between a pair of the reflecting surfaces 72, 73 of the resonator 71. For example, a fundamental wave laser beam of 1064 nm in wavelength from the laser source 6 is incident to the nonlinear optical crystal element 4 of LN or the like between a pair of reflecting surfaces 1, 2 of the external resonator 3. Then, for example, the SHG laser beam of 532 nm in wavelength is generated, and one of the reflecting surfaces, for example, the reflecting surface 73 of the resonator 71 of the laser source 6 is moved in the optical axis direction by the electromagnetic actuator as the moving means.

In this arrangement, when the oscillation frequency of the fundamental wave laser beam from the laser source 6 is changed, the reflectance of the external resonator 3 to the laser beam is changed, so that the laser beam can enter into the external resonator 3 at a high efficiency and with good stability. The servo for the resonator which is associated with the driving means 5 of the laser source 6 can be performed by the reflected light (return light) of the laser beam from the external resonator in the same way as mentioned with reference to FIGS. 6 to 14.

In the basic arrangements of FIGS. 18 and 19, the laser medium 71 may be made of Nd:YVO4, neodymium tetraphosphate (LNP), nedymiumdoped lanthanumberyllate (Nd:BEL) or the like other than Nd:YAG. The nonlinear optical crystal element 3 may be made of (KTP), quasi-phase matched (QPM), LN, LBO, BBO or the like other than LN.

The laser source 6 may be a so-called SHG laser oscillator. The laser source of which the first basic arrangement is shown in FIG. 18 is replaced by an SHG laser oscillator as shown in FIG. 20. In FIG. 20, the laser medium 74 of Nd:YAG or the like and a nonlinear optical crystal element 75 of KTP(KTiOPO4) or the like are provided between the pair of reflecting surfaces 72, 73 of the resonator 71 for SHG laser generation. The fundamental wave laser beam of 1064 nm in wavelength from the laser medium 74 is passed through the nonlinear optical crystal element 75, thereby making it be resonated so that a SHG laser beam of, for example, 532 nm is generated. This SHG laser beam is fed to the external resonator 3. One of the pair of the reflecting surfaces 1, 2 of the external resonator 3, for example, the reflecting surface 2 is moved by, for example, the electromagnetic actuator as the moving means 5 in the optical axis direction. The nonlinear optical crystal element 4 of BBO or the like of the external resonator 3 generates the second harmonic of the incident laser beam, or the fourth harmonic of the original fundamental wave laser beam (of 1064 nm in wavelength), or for example a laser beam of 266 nm. This laser beam is taken out of the external resonator 3.

Although not shown, one of the pair of mirrors of the SHG laser oscillator as a laser source may be driven by the electromagnetic actuator in association with the basic arrangement of FIG. 19. Thus, when the laser resonator of second harmonic generation type is provided as a laser source and is a laser oscillator of homogeneous line broading such as a solid-state laser oscillator, polarized light oscillation occurs in a mode nearest to the peak of the gain curve (frequency characteristic curve of gain). Thus, since the gain is saturated, the single mode oscillation is to occur, but actually multimode oscillation is sometimes caused by the hole burning effect. This is because the gain is not sufficiently saturated due to the nodes of a standing wave which is present within the laser resonator 71. When a longitudinal multimode is present within the same polarized light mode as the fundamental wave laser beam, mode hop noise may occur due to mode coupling within the same polarized light mode.

It is desired that the following techniques be used to control the hole burning effect in the SHG laser resonator and to prevent the generation of mode hop noise.

One of the techniques is optical element, or the so-called etalon or the like for controlling the coupling due to the sum frequency generation between the two polarization modes of the fundamental wave laser beam is provided within the laser resonator or that a laser medium is disposed near a $\frac{1}{4}$ wavelength plate in order to control the multimode oscillation due to the hole burning effect. The other one is that an optical element is provided for controlling the coupling between the two eigenplarization modes of the fundamental wave laser beam and that an adjustment element is provided for adjusting the polarization in order that the fundamental wave laser beam which goes back and force in the laser medium is circularly polarized.

If the optical path length of the resonator of the SHG laser source is selected to be an integral multiple of that of the external resonator, the SHG laser beam can be entered into the external resonator at a high efficiency. This is required in order to enter into the external resonator all the longitudinal modes of the SHG laser beam based on the two intrinsicpolarization modes of the fundamental wave laser beam which are caused by inserting a double reflectance element such as a ¼ wavelength plate within the resonator of the SHG laser source in which the so-called type-II phase matching condition is satisfied between the fundamental wave laser beam and the SHG laser beam. If the optical path length of the resonator of the SHG laser source is selected to be an integral multiple of that of the external resonator, a plurality of modes can be made incident at a high efficiency.

In other words, the SHG laser beam from the laser resonator of SHG (second harmonic generation), in which the frequency difference between the longitudinal modes of the two eigenpolarization modes of the resonator which has a nonlinear optical crystal element is an odd multiple of half the resonant longitudinal mode distance, is incident to the external resonator having a nonlinear optical crystal element. In addition, the optical path length of the external resonator is selected to be an integral multiple of that of the SHG laser resonator. Thus, two modes or more of the laser beam from the SHG laser resonator can be introduced into the external resonator at a time, making it possible to increase the efficiency of the multistage wavelength conversion.

FIG. 21 shows another laser beam generator of the invention which has two external resonators 3a, 3b disposed in series. In this embodiment of FIG. 21, the laser beam of, for example, 1064 nm in wavelength from the resonator 71 as a fundamental wave laser source is introduced into the first external resonator 3a so that it is converted into an SHG laser beam of, for example, 532 nm by the nonlinear optical effect of the nonlinear opticalcrystal element 4a such as LN. This SHG laser beam is further introduced into the second external resonator 3b so that it is converted into a fourth harmonic generation (FHG) laser beam of, for example, 266 nm by the nonlinear optical effect of the nonlinear optical crystal element 4b such as beta-barium borate (BBO). One of a pair of reflecting surfaces 1a, 2a of the first external resonator 4a, for example, the reflecting surface 2a is displaced in the optical axis direction by the moving means 5 such as the electromagnetic actuator. One of a pair of reflecting surfaces 1b, 2b of the second external resonator 3b, for example, the reflecting surface 2b is displaced in the optical axis direction by the moving means 5b such as the electromagnetic actuator. Thus, the optical path length conditions between the resonators 71, 3a, 3b are satisfied.

Figure 22:
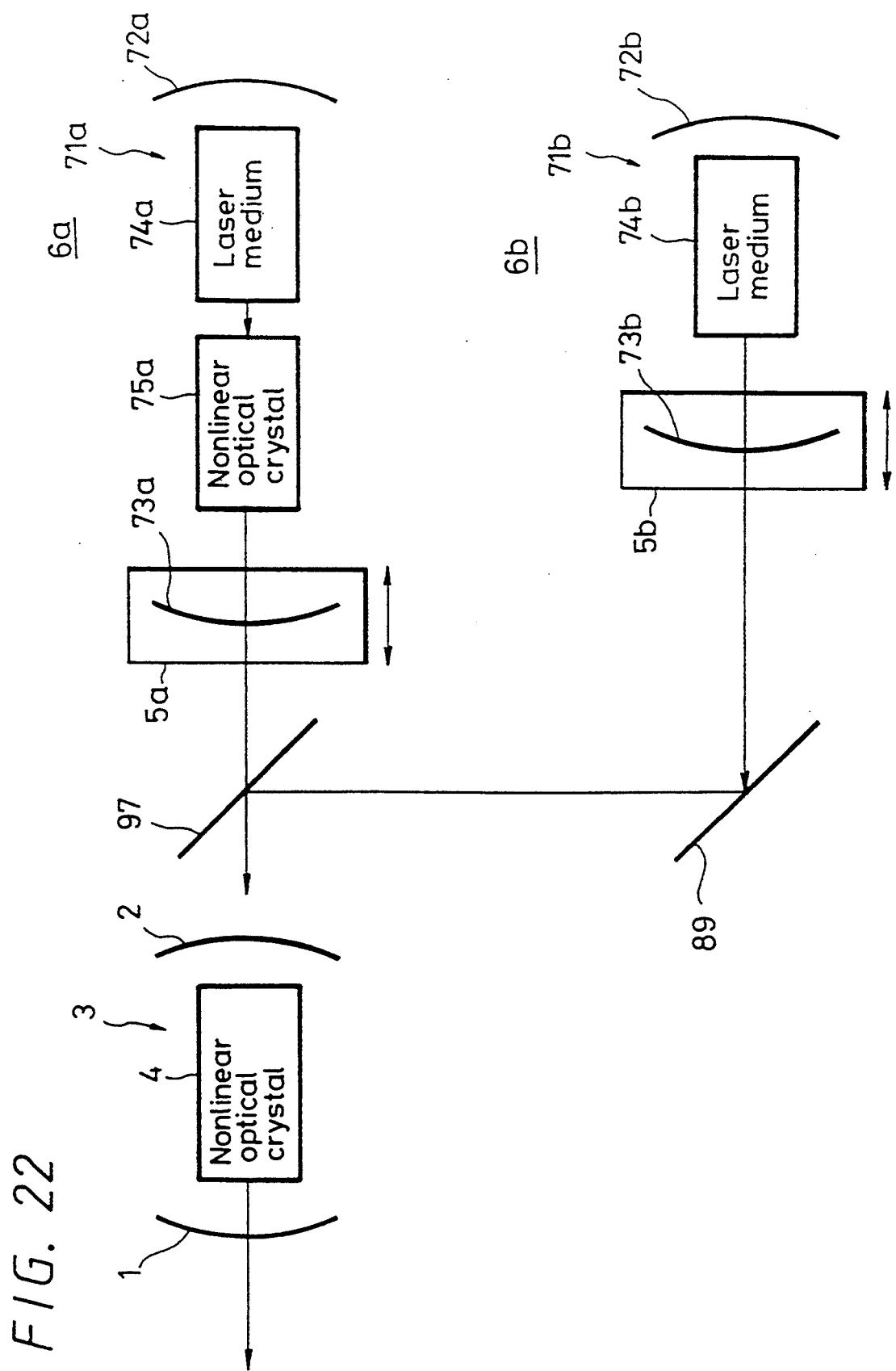
FIG. 22—A diagram showing a construction of the laser beam generator of the invention.

FIG. 22 shows another laser beam generator of the invention which makes wavelength conversion by the so-called sum frequency mixing. An SHG laser beam of, for example, 532 nm in wavelength from such an SHG laser source 6a as described with reference to FIG. 20 is fed through a synthetic mirror 97 such as a so-called dichroic mirror to the external resonator 3. One of a pair of reflecting surfaces 72a, 73a of the resonator 71a of the SHG laser source 6a, for example, the reflecting surface 73a is displaced in the optical axis direction by the moving means 5b such as the electromagnetic actuator as described above. As like elements corresponding to those in FIG. 19 are identified by the same reference numerals with subscript "b" attached in place of "a", a laser beam of, for example, 1064 nm in wavelength from the laser source 6b is polarized by the mirror (reflecting surface) 98 and sent through the synthetic mirror 97 to the external resonator 3. In this external resonator 3, the laser beam of 532 nm and the laser beam of 1064 nm are mixed to form a laser beam of sum frequency by the nonlinear optical effect of the nonlinear optical crystal element 4 such as BBO. As a result, a laser beam of, for example, 355 nm in wavelength is generated and taken out.

This invention is not limited only to the above embodiments. For example, the wavelength of the fundamental wave laser beam from the laser medium of Nd:YAG may be a component of 1064 nm, 956 nm or 1318 nm. The laser source may be, in addition to the solid-state laser, the semiconductor laser such as the so-called laser diode or the gas laser such as the He-Ne laser. The laser beam from each light source for sum-frequency mixing as shown in FIG. 22 may be the laser beam from the external resonator shown in FIG. 21.

In addition, while in each of the embodiments mentioned above, the incident laser beam to the external resonator 3 is modulated in phase by the phase modulator 7 to produce a resonator length error signal, this phase modulator 7 may be omitted, and instead a phase modulating moving means 105 may be provided in the moving means provided in at least one of the pair of reflecting means 1, 2 or 72, 73 of the external resonator 3 or the resonator of the light source 6 for the incident laser beam thereto, or in the moving means 5 as the so-called servo actuator for the resonator length control, or separately therefrom and by which this reflecting means can be moved a very small distance in the optical axis direction. This moving means 105 is always vibrated a very little at a certain frequency of, for example, f=10 MHz along the optical axis direction. As a result, the reflected light (return light) from the external resonator 3 is equivalently modulated at a frequency of, for example, fm=10 MHz. Thus, the moving means 5 can be servo-controlled by the same means as mentioned with reference to FIGS. 1, 6 to 14.

Figure 23:
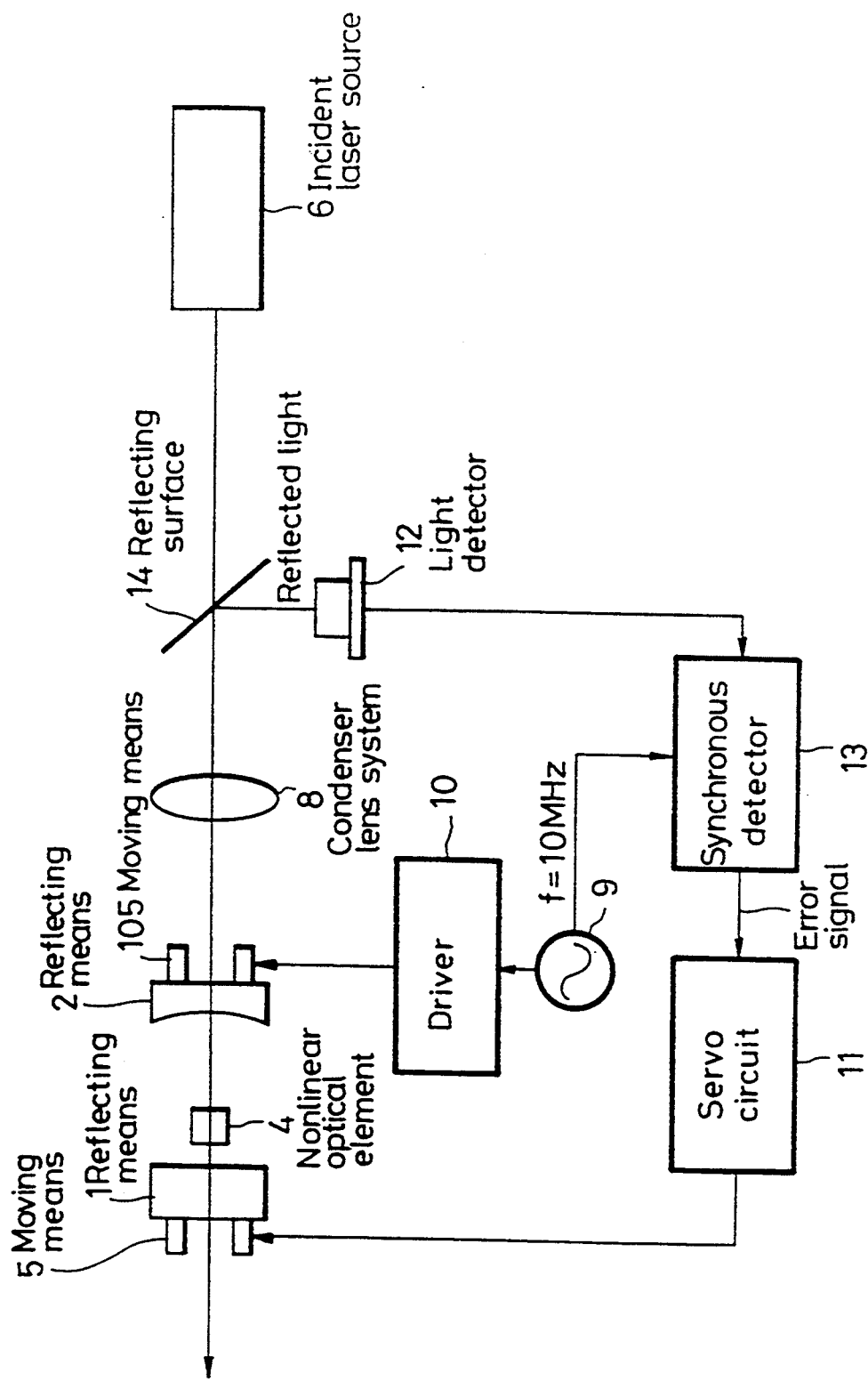
FIG. 23—A construction diagram of another embodiment of the invention.
Figure 24:
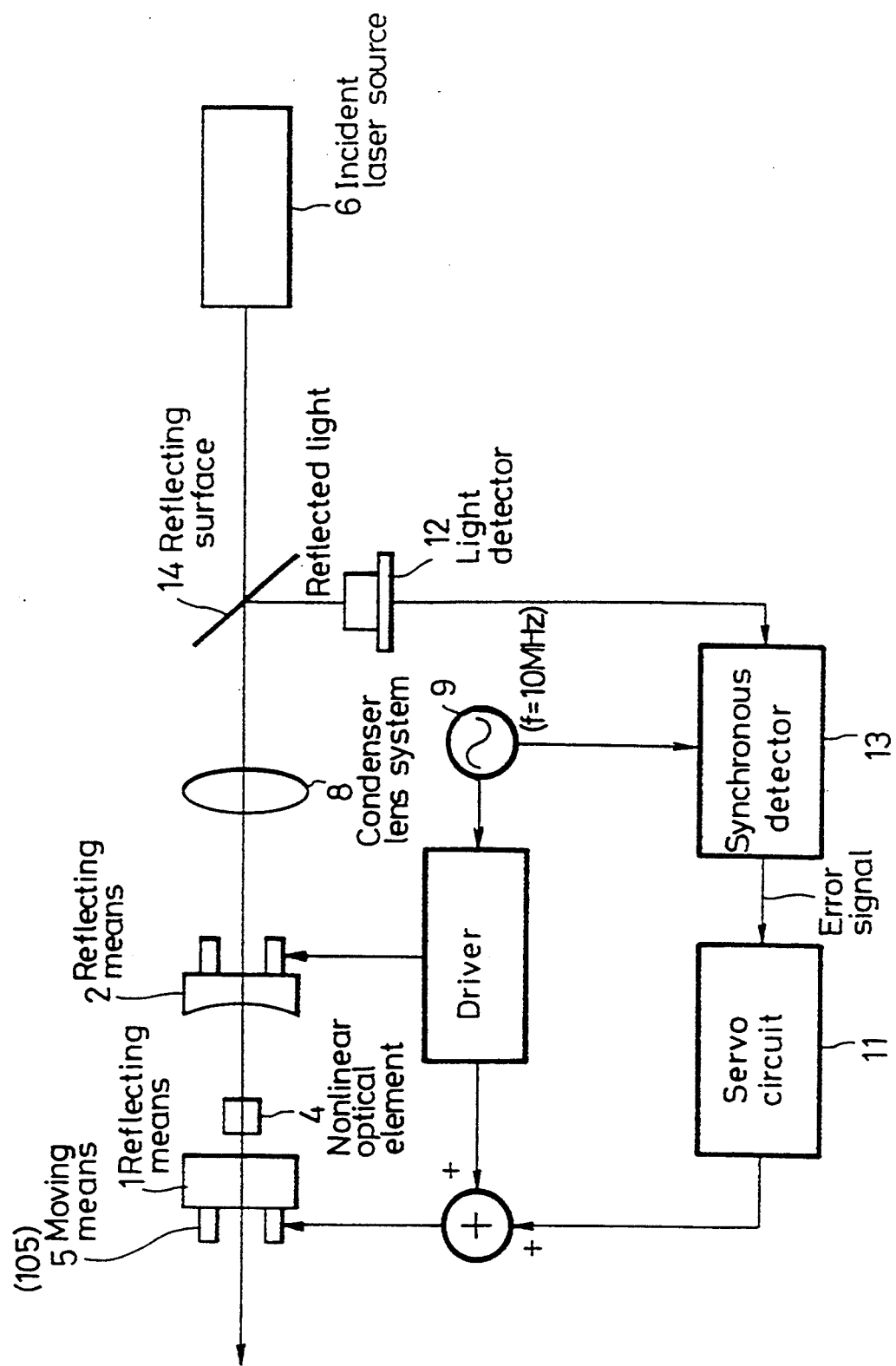
FIG. 24—A construction diagram of another embodiment of the invention.

FIGS. 23 and 24 show examples of this case. In FIGS. 23 and 24, like elements corresponding to those in FIG. 1 are identified by the same reference numerals and will not be described.

In FIG. 23, the phase modulating moving means 105 is provided in the reflecting means 2 of the external resonator 3 to be separate from the servo moving means 5.

In FIG. 24, the phase modulating moving means 105 serves both as itself and as the servo moving means 5 so as to make resonator length control and the very small phase modulating vibration.

The phase modulating moving means 105 may be used to serve both as itself and as the moving means 5 or the means 105 may be provided to be separate from the moving means 5.

What is claimed is:

1. A laser beam generator for generating a wavelength converted laser beam comprising:
   a source of light;
   an external resonator;
   a pair of reflecting means provided at said external resonator;
   a nonlinear optical crystal provided in said external resonator and provided an incident laser beam from said source of light thereto;
   a moving means for moving at least one of said pair of reflecting means in an optical axis direction and making resonator length control; and
   wherein said moving means is supplied with a resonator length error signal due to a deviation between the length of said external resonator and that to said incident laser beam and with a reflected signal from said resonator as a result of reflection of said incident laser beam from said resonator as pulling-in signals for resonator length servo.

2. A laser beam generator for generating a wavelength converted laser beam comprising:
   a source of light;
   a resonator;
   a pair of reflecting means provided at said resonator;
   a nonlinear optical crystal provided in said resonator and provided an incident laser beam from said source of light thereto;
   a laser medium provided between said pair of reflecting means;
   a moving means for moving at least one of said pair of reflecting means in an optical axis direction and making resonator length control; and
   wherein said moving means is supplied with a resonator length error signal due to a deviation between the length of said resonator and that to said incident laser beam and with a reflected signal from said resonator as a result of reflection of said incident laser beam from said resonator as pulling-in signals for resonator length servo.

3. A laser beam generator according to claim 1, a zero-cross level of said resonator length error signal and a certain level or above of said reflected light signal are detected to user as said pulling-in signal for said resonator length servo.

4. A laser beam generator according to claim 2, a zero-cross level of said resonator length error signal and a certain level or above of said reflected light signal are detected to user as said pulling-in signal for said resonator length servo.

5. A laser beam generator according to claim 1, said resonator length error signal is generated by a synchronous detecting means.

6. A laser beam generator according to claim 2, said resonator length error signal is generated by a synchronous detecting means.

7. A laser beam generator according to claim 1, said moving means of said reflecting means is vibrated at a certain frequency so that said incident laser beam to said external resonator is modulated in phase.

8. A laser beam generator according to claim 2, said moving means of said reflecting means is vibrated at a certain frequency so that said incident laser beam to said external resonator is modulated in phase.

9. A laser beam generator for generating a wavelength converted laser beam comprising:
   a source of light;
   a external resonator;
   a pair of reflecting means provided at said external resonator;
   a nonlinear optical crystal provided in said resonator and provided an incident laser beam from said source of light thereto;
   a moving means for moving at least one of said pair of reflecting means in an optical axis direction and making resonator length control; and
   wherein said moving means is supplied with a resonator length error signal due to a deviation between the length of said external resonator and that to said incident laser beam and with a reflected signal from said resonator as a result of reflection of said incident later beam from said resonator for pulling-in resonator length servo when a zero-cross level of said error signal is detected during a certain time $\tau$ after said resonator length error signal is compared with a certain slice level so that a rising signal is detected.

10. A laser beam generator for generating a wavelength converted laser beam comprising:
    a source of light;
    a resonator;
    a pair of reflecting means provided at said resonator;
    a nonlinear optical crystal provided in said resonator and provided an incident laser beam from said source of light thereto;
    a laser medium provided between said pair of reflecting means;
    a moving means for moving at least one of said pair of reflecting means in an optical axis direction and making resonator length control; and
    wherein said moving means is supplied with a resonator length error signal due to a deviation between the length of said resonator and that to said incident laser beam and with a reflected signal from said resonator as a result of reflection of said incident laser beam from said resonator for pulling-in resonator length servo when a zero-cross level of said error signal is detected during a certain time $\tau$ after said resonator length error signal is compared with a certain slice level so that a rising signal is detected.

11. A laser beam generator for generating a wavelength converted laser beam comprising:
    a source of light;
    a external resonator;
    a pair of reflecting means provided at said resonator;
    a nonlinear optical crystal provided in said resonator and provided an incident laser beam from said source of light thereto, said incident laser beam of a frequency fc modulated in phase by a frequency fm to produce a phase-modulated signal;
    a clock signal generated from said phase-modulated signal and used to sample and hold said phase-modulated signal;
    a moving means for moving at least one of said pair of reflecting means in an optical axis direction and making resonator length control; and
    wherein said moving means is supplied with a resonator length error signal due to a deviation between the length of said external resonator and that to said incident laser beam and with a reflected signal from said resonator as a result of reflection of said incident laser beam from said resonator as pulling-in signals for resonator length servo.

12. A laser beam generator for generating a wavelength converted laser beam comprising:
    a source of light;
    a resonator;
    a pair of reflecting means provided at said resonator;
    a nonlinear optical crystal provided in said resonator and provided an incident laser beam from said source of light thereto; said incident laser beam of a frequency fc modulated in phaser by a frequency fm to produce a phase-modulated signal;
    a clock signal generated from said phase-modulated signal and used to sample and hold said phase-modulated signal;
    a laser medium provided between said pair of reflecting means;
    a moving means for moving at least one of said pair of reflecting means in an optical axis direction and making resonator length control; and wherein said moving means is supplied with a resonator length error signal due to a deviation between the length of said resonator and that to said incident laser beam and with a reflected signal from said resonator as a result of reflection of said incident laser beam from said resonator as pulling-in signals for resonator length servo.

13. A laser beam generator according to claim 5 wherein said synchronous detecting means is sample-and-hold means.

14. A laser beam generator according to claim 6 wherein said synchronous detecting means is sample-and-hold means.

* * * * *